US011023243B2

(12) United States Patent
Tekmen et al.

(10) Patent No.: US 11,023,243 B2
(45) Date of Patent: Jun. 1, 2021

(54) LATENCY-BASED INSTRUCTION RESERVATION STATION CLUSTERING IN A SCHEDULER CIRCUIT IN A PROCESSOR

(71) Applicant: Microsoft Technology Licensing, LLC, Redmond, WA (US)

(72) Inventors: Yusuf Cagatay Tekmen, Raleigh, NC (US); Shivam Priyadarshi, Morrisville, NC (US); Rodney Wayne Smith, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 2 days.

(21) Appl. No.: 16/518,341

(22) Filed: Jul. 22, 2019

(65) Prior Publication Data

US 2021/0026639 A1    Jan. 28, 2021

(51) Int. Cl.
*G06F 9/38* (2018.01)

(52) U.S. Cl.
CPC .......... *G06F 9/3838* (2013.01); *G06F 9/3836* (2013.01); *G06F 9/3869* (2013.01)

(58) Field of Classification Search
CPC .............................. G06F 9/3836; G06F 9/3838
See application file for complete search history.

(56) References Cited

U.S. PATENT DOCUMENTS

| 6,112,019 | A | * | 8/2000 | Chamdani | ............. | G06F 9/3836 712/214 |
| 10,223,126 | B2 | | 3/2019 | Thompto | | |
| 2003/0014613 | A1 | * | 1/2003 | Soni | ...................... | G06F 9/3855 712/217 |
| 2004/0123077 | A1 | * | 6/2004 | Shebanow | ............ | G06F 9/3836 712/217 |
| 2013/0339679 | A1 | * | 12/2013 | Iyer | ....................... | G06F 9/3836 712/225 |
| 2014/0325187 | A1 | | 10/2014 | Estlick et al. | | |

(Continued)

OTHER PUBLICATIONS

"International Search Report and Written Opinion Issued in PCT Application No. PCT/US2020/035493", dated Sep. 14, 2020, 16 Pages.

(Continued)

*Primary Examiner* — Jacob Petranek
(74) *Attorney, Agent, or Firm* — Withrow & Terranova, PLLC

(57) ABSTRACT

Latency-based instruction reservation clustering in a scheduler circuit in a processor is disclosed. The scheduler circuit includes a plurality of latency-based reservation circuits each having an assigned producer instruction cycle latency. Producer instructions with the same cycle latency can be clustered in the same latency-based reservation circuit. Thus, the number of reservation entries is distributed among the plurality of latency-based reservation circuits to avoid or reduce an increase in the number of scheduling path connections and complexity in each reservation circuit to avoid or reduce an increase in scheduling latency. The scheduling path connections are reduced for a given number of reservation entries over a non-clustered pick circuit, because signals (e.g., wake-up signals, pick-up signals) used for scheduling instructions in each latency-based reservation circuit do not have to have the same clock cycle latency so as to not impact performance.

22 Claims, 13 Drawing Sheets

(56) References Cited

U.S. PATENT DOCUMENTS

2015/0134935 A1\* 5/2015 Blasco ................ G06F 9/30112
              712/220
2016/0259648 A1\* 9/2016 Di ........................ G06F 9/3851
2017/0090934 A1\* 3/2017 Di ........................ G06F 9/30032
2019/0332385 A1\* 10/2019 Smith .................. G06F 9/3851

OTHER PUBLICATIONS

Sharkey, et al., "Non-uniform Instruction Scheduling", In Proceedings of the European Conference on Parallel Processing, Aug. 30, 2005, pp. 540-549.

\* cited by examiner

LATENCY-BASED INSTRUCTION RESERVATION STATION CLUSTERING IN A SCHEDULER CIRCUIT IN A PROCESSOR

FIELD OF THE DISCLOSURE

The technology of the disclosure relates to computer processors ("processors"), and more particularly to scheduling of execution of instructions in an instruction pipeline in an instruction processing circuit in a processor.

BACKGROUND

Microprocessors, also known as "processors," perform computational tasks for a wide variety of applications. A conventional microprocessor includes a central processing unit (CPU) that includes one or more processor cores, also known as "CPU cores." The CPU executes computer program instructions ("instructions"), also known as "software instructions" to perform operations based on data and generate a result, which is a produced value. An instruction that generates a produced value is a "producer" instruction. The produced value may then be stored in memory, provided as an output to an input/output ("I/O") device, or made available (i.e., communicated) as an input value to another "consumer" instruction executed by the CPU, as examples. Thus, a consumer instruction is dependent on the produced value produced by a producer instruction as an input value to the consumer instruction for execution. These producer and consumer instructions are also referred to collectively as dependent instructions.

Instruction pipelining is a processing technique whereby the throughput of instructions being executed by a processor may be increased by splitting the handling of each instruction into a series of steps. These steps are executed in one or more instruction pipelines each composed of multiple stages in an instruction processing circuit in a processor. Optimal processor performance may be achieved if all stages in an instruction pipeline are able to process instructions concurrently and sequentially as the instructions are ordered in the instruction pipeline. Also, many modern processors are out-of-order processors that are capable of dataflow execution of instructions based on availability of input data to be consumed by the instructions rather than the program order of the instructions. Thus, the out-of-order processor may execute an instruction as soon as all input data to be consumed by the instruction has been produced. While dataflow order processing of instructions may cause the specific order in which instructions are executed to be unpredictable, dataflow order execution in an out-of-order processor may realize performance gains. For example, instead of having to "stall" (i.e., intentionally introduce a processing delay) while input data to be consumed is retrieved for an older instruction, the out-of-order processor may proceed with executing a more recently fetched instruction that is able to execute immediately. In this manner, processor clock cycles that would otherwise be unused for instruction processing and execution may be productively utilized by the out-of-order processor.

An instruction processing circuit in a processor includes an instruction fetch circuit that is configured to fetch instructions to be executed from an instruction memory (e.g., system memory or an instruction cache memory). The instruction memory may be provided in or as part of a system memory in the processor-based system, as an example. The fetched instructions are decoded and inserted into an instruction pipeline in the instruction processing circuit to be pre-processed before reaching an execution circuit to be executed. The decoded instructions are also provided to a reservation circuit in a scheduler circuit. The scheduler circuit is configured to issue a decoded instruction from the reservation circuit to an execution circuit to be executed once all source register operands (e.g., immediate values, values stored in memory, and produced values from a producer instruction) are available and any structural hazards for the decoded instruction are resolved. For example, the scheduler circuit is responsible for making sure that the necessary values for operands of a decoded consumer instruction are available before issuing the decoded consumer instruction to an execution circuit for execution. The execution circuit is configured to execute decoded instructions received from the scheduler circuit.

The scheduler circuit is configured to issue a wake-up signal to "wake up" a consumer instruction in response to issuance of a producer instruction to the execution circuit. The wake-up signal indicates that a produced value from execution of the issued producer instruction will be available, and thus the consumer instruction of the producer instruction can now be issued to the execution circuit behind the producer instruction. In other words, once a producer instruction is scheduled by the scheduler circuit to be issued from the reservation circuit to the execution circuit, it is known that a produced value from execution of the producer instruction will soon become available for its consumer instruction. Because the wake-up signal is generated in response to a producer instruction being issued, its consumer instruction can only be woken up at least one (1) clock cycle behind the producer instruction so that the producer instruction is guaranteed to have executed before the consumer instruction executes with the produced value of the consumer instruction. Thus, a critical timing path in an instruction processing circuit in a processor is the wake-up path in the scheduler circuit to wake-up instructions to be issued to the execution circuit. The wake-up or scheduling latency of an instruction is the number of clock cycles after issuance its produced value is available to be consumed by a consumer instruction. Some producer instructions are single clock cycle ("single-cycle") latency producers, meaning that the execution circuit can generate and make available a produced value for the producer instruction in one (1) clock cycle. Other producer instructions are multiple clock cycle latency producers, meaning that the execution circuit generates and makes available a produced value for the producer instruction in more than one (1) clock cycle. An important part of the wake-up design in the scheduler circuit is that a consumer instruction that is dependent on a single-cycle latency producer instruction can be issued by the scheduler circuit in back-to-back clock cycles with the producer instruction to reduce scheduling latency.

A conventional scheduler circuit includes a reservation circuit that has 'M' reservation entries to store M instructions waiting to be issued for execution. The scheduler circuit also includes a pick circuit that controls when the M instructions in the reservation circuit are issued in issue lanes to be executed by an execution circuit. Each reservation entry in the reservation circuit is capable of receiving a wake-up signal from 'K' producer instructions capable of being issued by the scheduler circuit in each clock cycle. Thus, in this example, 'M' is referred to as the instruction window size, and 'K' is referred to as the issue width or the number of issue lanes to the execution circuit in which producer instructions can be issued to the execution circuit to be executed. In general, a larger M entry size and larger K issue width are desired for increased processor performance. As discussed above, an important part of the wake-up design in the scheduler circuit is that a consumer instruction that is dependent on a single-cycle latency producer instruction can be issued in back-to-back clock cycles with the producer instruction. Three (3) main components of the wake-up timing path in a scheduler circuit that affect a single-cycle wake-up are: (1) propagation time (i.e., timing delay) in coupling K wake-up signals from K issue lanes to the pick circuit as a result of K producer instructions issued in the issue lanes; (2) propagation time through the pick circuit which employs a scheme to pick up to K instructions to issue from the M entries in the reservation circuit; and (3) the propagation time in coupling K pick signals generated by the pick circuit to M entries in the reservation circuit to select K of the M entries to be issued in the K issue lanes. It may be desired to increase the instruction window size M in a reservation circuit in an instruction processing circuit of a processor to increase processor performance. The greater the instruction window size, the more likely there are K available instructions that are always ready to be issued in the K issue lanes to maximize the efficiency of the execution circuit. However, increasing the instruction window size M for increased performance can have an adverse effect on latency on all three (3) components of the wake-up timing path.

SUMMARY

Exemplary aspects disclosed herein include latency-based instruction reservation clustering in a scheduler circuit in a processor. The processor includes an instruction processing circuit that includes a number of instruction processing stages configured to pipeline the processing and execution of fetched instructions according to a dataflow execution. A scheduler circuit is included in an instruction processing stage in the instruction processing circuit to schedule issuance of instructions to the execution circuit to be executed. The scheduler circuit is responsible for issuing an instruction into an issue lane for execution by the execution circuit once it is known that the necessary values for the operand(s) of the instruction will be available when the instruction is executed. Thus, a consumer instruction is issued by the scheduler circuit once it is known that a necessary produced value(s) from a producer instruction(s) will be available before the consumer instruction is executed. The latency of the producer instruction is the number of clock cycles ("cycles") after its issuance that its produced value will be available to be consumed by the consumer instruction. The scheduler circuit should ideally be designed such that a consumer instruction that is dependent on a single-cycle latency producer instruction can be issued in back-to-back clock cycles with the producer instruction for performance. Also, it may be desired to increase the number of the reservation entries in the scheduler circuit to increase scheduling performance, because increasing reservation entries increases the likelihood there will be sufficient instructions ready to be issued in each of the issue lanes. However, increasing the reservation entries in the scheduler circuit increases the number of scheduling path connections and complexity in the scheduler circuit, thus increasing scheduling latency. The scheduling latency may increase such that all single-cycle latency producer instructions may not be able to be issued by the scheduler circuit in back-to-back clock cycles with the producer instruction.

Thus, in exemplary aspects disclosed herein, a latency-based clustered scheduler circuit ("clustered scheduler circuit") is provided in an instruction processing circuit of a processor that includes a plurality of latency-based reservation circuits. Each latency-based reservation circuit has an assigned producer instruction cycle latency so that consumer instructions received in the scheduler circuit that are dependent on producers with a specific cycle latency can be clustered in the same latency-based reservation circuit. For example, consumer instructions dependent on single-cycle latency producer instructions will be clustered together in the same latency-based reservation circuit that has a designated one (1) clock cycle latency. As another example, consumer instructions dependent on producer instructions that have a three-cycle latency will be clustered together in another latency-based reservation circuit that is designated to reserve for issuance three (3) clock cycle latency producer instructions. In this manner, the number of reservation entries in the clustered scheduler circuit is distributed among the plurality of latency-based reservation circuits to avoid or reduce an increase in the number of scheduling path connections and complexity in each reservation circuit to avoid or reduce an increase in scheduling latency for a given number of reservation entries. The scheduling path connections are reduced for a given number of reservation entries over a non-clustered pick circuit, because signals (e.g., wake-up signals, pick-up signals) used for scheduling instructions to be issued in each latency-based reservation circuit do not have to have the same clock cycle latency so as to not impact performance. For example, a latency-based reservation circuit that has an assigned cycle-latency of two (2) clock cycles does not have to schedule a consumer instruction back-to-back clock cycle with the issuance of a producer instruction, because the producer instruction will not generate a produced result in one (1) clock cycle. Thus, these signals used by the latency-based reservation circuits for scheduling of instructions can be isolated from each other, and having different cycle-latencies, thus only having to be coupled to their respective latency-based reservation circuits, thus reducing connection complexity. For example, signals used to schedule instructions in a two (2) cycle latency-based reservation circuit can have a clock-cycle latency of two (2) clock cycles without affecting scheduling performance. However, a latency-based reservation circuit that has an assigned cycle-latency of one (1) clock cycle can only schedule a consumer instruction back-to-back clock cycle with the issuance of a producer instruction if signals used to schedule such instructions do not have a clock-cycle latency greater than one (1) clock cycle.

Thus, latency-based instruction reservation clustering in a clustered scheduler circuit may allow the number of reservation entries in the scheduler circuit to be increased while avoiding an increase in scheduling latency, or avoiding an increase in scheduling latency that is undesired from a performance standpoint. For example, the number of reservation entries in the scheduler circuit may be increased without risking consumer instructions dependent on single-cycle latency producer instructions not being issued in back-to-back clock cycles. The overall total number of reservation entries in the scheduler circuit distributed over the plurality of latency-based reservation circuits can be increased according to any design parameters or goals, such that the performance of the processor is increased over what it otherwise would be if only one (1), non-clustered reservation circuit were provided in the scheduler circuit.

In one example, pick circuits associated with the respective latency-based reservation circuits in the clustered scheduler circuit are each configured to determine if instructions in its associated latency-based reservation circuits are ready to be scheduled for execution based on wake-up signals generated from the issue lanes. The pick circuits associated with the respective latency-based reservation circuits are also each configured to generate pick signals to its associated latency-based reservation circuits to cause an instruction ready to be executed in its associated latency-based reservation circuits to be inserted into an issue lane in response to the instruction being ready for execution. In one example, to provide signals used for scheduling of instructions for each latency-based reservation circuit that has a clock-cycle latency within its respective latency-based reservation so as to not affect performance, the clustered scheduler circuit includes a plurality of wake-up signal registers each associated with a latency-based reservation circuit and configured to store cycle-delayed wake-up signals generated from the issue lanes used by the respective pick circuits to wake up instructions in its respective latency-based reservation circuit. In another example, to provide signals used for scheduling of instructions for each latency-based reservation circuit that has a clock-cycle latency within its respective latency-based reservation so as to not affect performance, the clustered scheduler circuit includes a plurality of pick signal registers each associated with a latency-based reservation circuit and configured to store cycle-delayed pick signals generated from the respective latency-based reservation circuits to pick which instructions from the latency-based reservation circuits are issued to the common issue lanes.

In this regard, in one exemplary aspect, a clustered scheduler circuit in a processor is configured to receive a plurality of instructions comprising producer instructions and consumer instructions to be scheduled for execution is disclosed. The clustered scheduler circuit comprises a first latency-based reservation circuit configured to receive first consumer instructions among the plurality of instructions dependent on the producer instructions having a single clock cycle latency. The first latency-based reservation circuit is also configured to store the first consumer instructions in first reservation entries among a plurality of first reservation entries, and select a plurality of first consumer instructions stored among the plurality of first reservation entries identified as having an issue state of issue ready. The clustered scheduler circuit further comprises a first pick circuit coupled to the plurality of first reservation entries and a single clock cycle latency wake-up signal port. The first pick circuit is configured to receive a plurality of single clock cycle latency wake-up signals on the single clock cycle latency wake-up signal port each associated with an issue lane among a plurality of issue lanes, the plurality of single clock cycle latency wake-up signals each indicating an issue state of a single clock cycle latency producer instruction in an issue lane among the plurality of issue lanes. The first pick circuit is also configured to determine if the plurality of first consumer instructions are ready to be scheduled for execution, in response to the plurality of single clock cycle latency wake-up signals associated with the single clock cycle latency producer instruction of the plurality of first consumer instructions having an issue state of issue ready. The first pick circuit is configured to identify the plurality of first consumer instructions having the issue state of issue ready. The clustered scheduler circuit further comprises a second latency-based reservation circuit configured to receive second consumer instructions among the plurality of instructions dependent on the producer instructions having a same second clock cycle latency of at least two (2) clock cycles. The second latency-based reservation circuit is also configured to store the second consumer instructions in second reservation entries among a plurality of second reservation entries. The second latency-based reservation circuit is also configured to select a plurality of second consumer instructions stored among the plurality of second reservation entries identified as having an issue state of issue ready. The clustered scheduler circuit further comprises a second pick circuit coupled to the plurality of second reservation entries and a second clock cycle latency wake-up signal port. The second pick circuit is configured to receive a plurality of second clock cycle latency wake-up signals on the second clock cycle latency wake-up signal port each associated with an issue lane among the plurality of issue lanes. The plurality of second clock cycle latency wake-up signals each indicate an issue state of a second clock cycle latency producer instruction in an issue lane among the plurality of issue lanes. The second pick circuit is also configured to determine if the plurality of second consumer instructions are ready to be scheduled for execution, in response to the plurality of second clock cycle latency wake-up signals associated with the second clock cycle latency producer instruction of the plurality of second consumer instructions having an issue state of issue ready. The second pick circuit is also configured to identify the plurality of second consumer instructions having the issue state of issue ready. The clustered scheduler circuit further comprises a plurality of issue arbitration circuits each coupled to an associated issue lane among the plurality of issue lanes and coupled to the first latency-based reservation circuit and the second latency-based reservation circuit. The plurality of issue arbitration circuits are each configured to pass an instruction among the selected plurality of first consumer instructions and the selected plurality of second consumer instructions to its associated issue lane. The clustered scheduler circuit further comprises a plurality of issue lane circuits comprising the plurality of issue lanes. Each issue lane circuit among the plurality of issue lane circuits is configured to generate a single clock cycle latency wake-up signal among the plurality of single clock cycle latency wake-up signals having an issue state of issue ready on the single clock cycle latency wake-up signal port, in response to a single clock cycle latency producer instruction issued in the issue lane circuit.

In another exemplary aspect, a method of scheduling a plurality of instructions comprising producer instructions and consumer instructions to be executed in an execution circuit in a processor is disclosed. The method comprises receiving first consumer instructions among the plurality of instructions dependent on producer instructions having a single clock cycle latency. The method further comprises storing the first consumer instructions in first reservation entries among a plurality of first reservation entries. The method further comprises receiving a plurality of single clock cycle latency wake-up signals each associated with an issue lane among a plurality of issue lanes, the plurality of single clock cycle latency wake-up signals each indicating an issue state of a single clock cycle latency producer instruction in an issue lane among the plurality of issue lanes. The method further comprises determining if the plurality of first consumer instructions are ready to be scheduled for execution, in response to the plurality of single clock cycle latency wake-up signals associated with the single clock cycle latency producer instruction of the plurality of first consumer instructions having an issue state of issue ready. The method also comprises identifying the plurality of first consumer instructions having the issue state of issue ready. The method also comprises selecting a plurality of first consumer instructions stored among the plurality of first reservation entries identified as having an issue state of issue ready. The method further comprises receiving second consumer instructions among the plurality of instructions dependent on producer instructions having a same second clock cycle latency of at least two (2) clock cycles. The method further comprises storing the second consumer instructions in second reservation entries among a plurality of second reservation entries. The method further comprises receiving a plurality of second clock cycle latency wake-up signals each associated with an issue lane among the plurality of issue lanes, the plurality of second clock cycle latency wake-up signals each indicating an issue state of a second clock cycle latency producer instruction in an issue lane among the plurality of issue lanes. The method further comprises selecting a plurality of second instructions stored among the plurality of second reservation entries identified as having an issue state of issue ready. The method further comprises determining if the plurality of second consumer instructions are ready to be scheduled for execution, in response to the plurality of second clock cycle latency wake-up signals associated with the second clock cycle latency producer instruction of the plurality of second consumer instructions having an issue state of issue ready. The method also comprises identifying the plurality of second consumer instructions having the issue state of issue ready. The method further comprises passing an instruction among the selected plurality of first consumer instructions and the selected plurality of second consumer instructions to its associated issue lane. The method further comprises generating a single clock cycle latency wake-up signal among the plurality of single clock cycle latency wake-up signals having an issue state of issue ready, in response to a single clock cycle latency producer instruction issued.

In another exemplary aspect, a processor is disclosed, the processor comprising an instruction processing circuit comprising one or more instruction pipelines. The instruction processing circuit comprises a clustered scheduler circuit and an execution circuit. The instruction processing circuit is configured to fetch a plurality of instructions from a memory into an instruction pipeline among the one or more instruction pipelines. The clustered scheduler circuit is configured to receive the plurality of instructions comprising producer instructions and consumer instructions to be scheduled for execution. The clustered scheduler circuit comprises a first latency-based reservation circuit configured to receive first consumer instructions among the plurality of instructions dependent on the producer instructions having a single clock cycle latency. The first latency-based reservation circuit is also configured to store the first consumer instructions in first reservation entries among a plurality of first reservation entries. The first latency-based reservation circuit is also configured to select a plurality of first consumer instructions stored among the plurality of first reservation entries identified as having an issue state of issue ready. The clustered scheduler circuit further comprises a first pick circuit coupled to the plurality of first reservation entries and a single clock cycle latency wake-up signal port. The first pick circuit is configured to receive a plurality of single clock cycle latency wake-up signals on the single clock cycle latency wake-up signal port each associated with an issue lane among a plurality of issue lanes, the plurality of single clock cycle latency wake-up signals each indicating an issue state of a single clock cycle latency producer instruction in an issue lane among the plurality of issue lanes. The first pick circuit is further configured to determine if the plurality of first consumer instructions are ready to be scheduled for execution, in response to the plurality of single clock cycle latency wake-up signals associated with the single clock cycle latency producer instruction of the plurality of first consumer instructions having an issue state of issue ready. The first pick circuit is further configured to identify the plurality of first consumer instructions having the issue state of issue ready. The clustered scheduler circuit further comprises a second latency-based reservation circuit configured to receive second consumer instructions among the plurality of instructions dependent on the producer instructions having a same second clock cycle latency of at least two (2) clock cycles. The second latency-based reservation circuit is further configured to store the second consumer instructions in second reservation entries among a plurality of second reservation entries. The second latency-based reservation circuit is further configured to select a plurality of second consumer instructions stored among the plurality of second reservation entries identified as having an issue state of issue ready. The clustered scheduler circuit further comprises a second pick circuit coupled to the plurality of second reservation entries and a second clock cycle latency wake-up signal port. The second pick circuit is configured to receive a plurality of second clock cycle latency wake-up signals on the second clock cycle latency wake-up signal port each associated with an issue lane among the plurality of issue lanes, the plurality of second clock cycle latency wake-up signals each indicating an issue state of a second clock cycle latency producer instruction in an issue lane among the plurality of issue lanes. The second pick circuit is further configured to determine if the plurality of second consumer instructions are ready to be scheduled for execution, in response to the plurality of second clock cycle latency wake-up signals associated with the second clock cycle latency producer instruction of the plurality of second consumer instructions having an issue state of issue ready. The second pick circuit is further configured to identify the plurality of second consumer instructions having the issue state of issue ready. The clustered scheduler circuit further comprises a plurality of issue arbitration circuits each coupled to an associated issue lane among the plurality of issue lanes and coupled to the first latency-based reservation circuit and the second latency-based reservation circuit. The plurality of issue arbitration circuits are each configured to pass an instruction among the selected plurality of first consumer instructions and the selected plurality of second consumer instructions to its associated issue lane. The clustered scheduler circuit also comprises a plurality of issue lane circuits comprising the plurality of issue lanes. Each issue lane circuit among the plurality of issue lane circuits is configured to generate a single clock cycle latency wake-up signal among the plurality of single clock cycle latency wake-up signals having an issue state of issue ready on the single clock cycle latency wake-up signal port, in response to a single clock cycle latency producer instruction issued in the issue lane circuit.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 2B-1 is a timing diagram illustrating an exemplary clock-cycle timing of reservation, issuance, and execution of a single-clock cycle latency producer instruction and consumer instruction in the non-clustered scheduler circuit in FIG. 2A;

FIG. 2B-2 is a timing diagram illustrating an exemplary clock-cycle timing of reservation, issuance, and execution of a 3-clock cycle latency producer instruction and consumer instruction in the non-clustered scheduler circuit in FIG. 2A;

Figure 1:
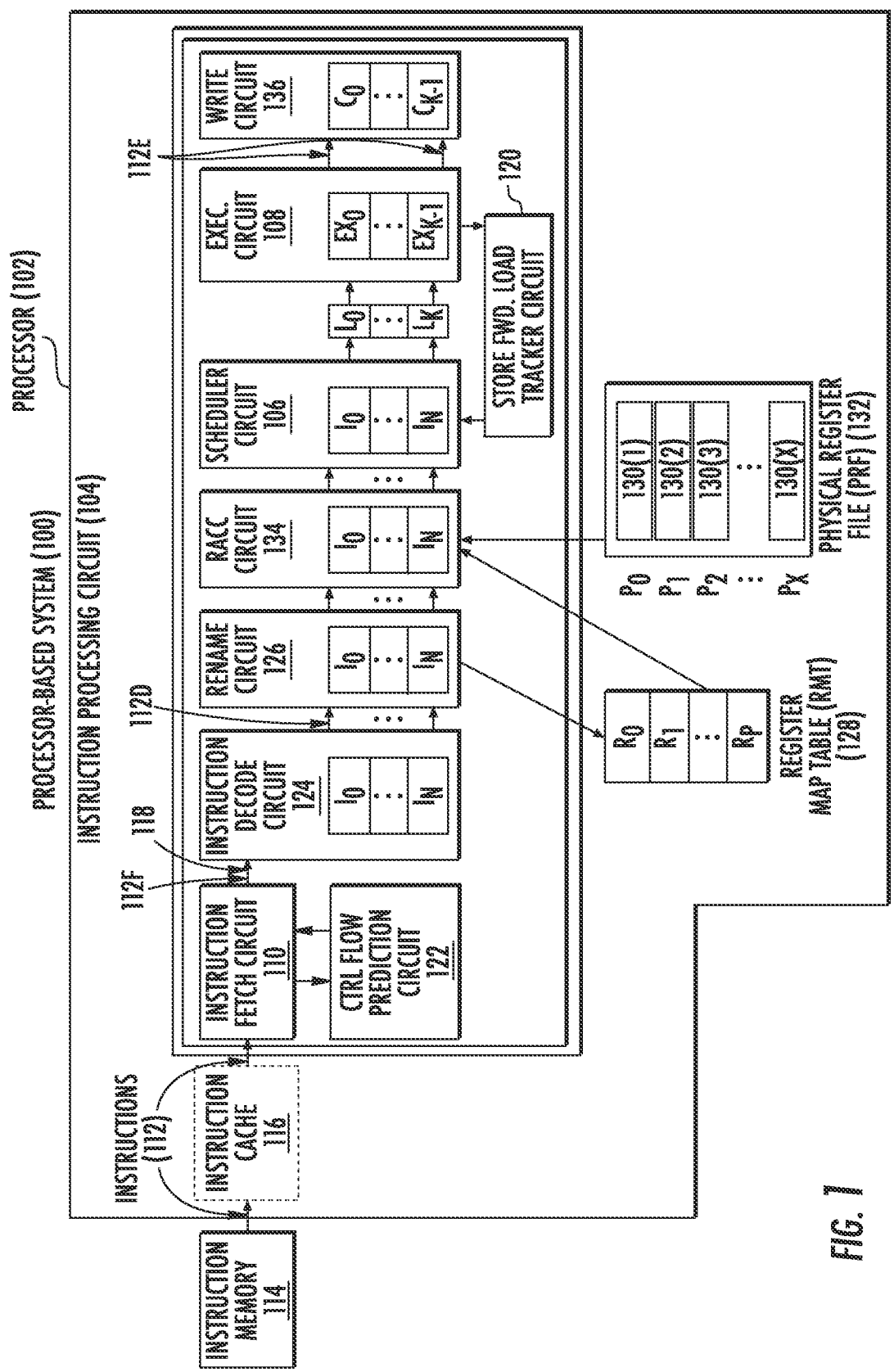
FIG. 1 is a diagram of an exemplary processor-based system that includes a processor with an instruction processing circuit that includes with one or more instruction pipelines for processing computer instructions for execution, wherein the instruction processing circuit includes a scheduler circuit configured to store and schedule issuance of instructions to an execution circuit to be executed.
Figure 2A:
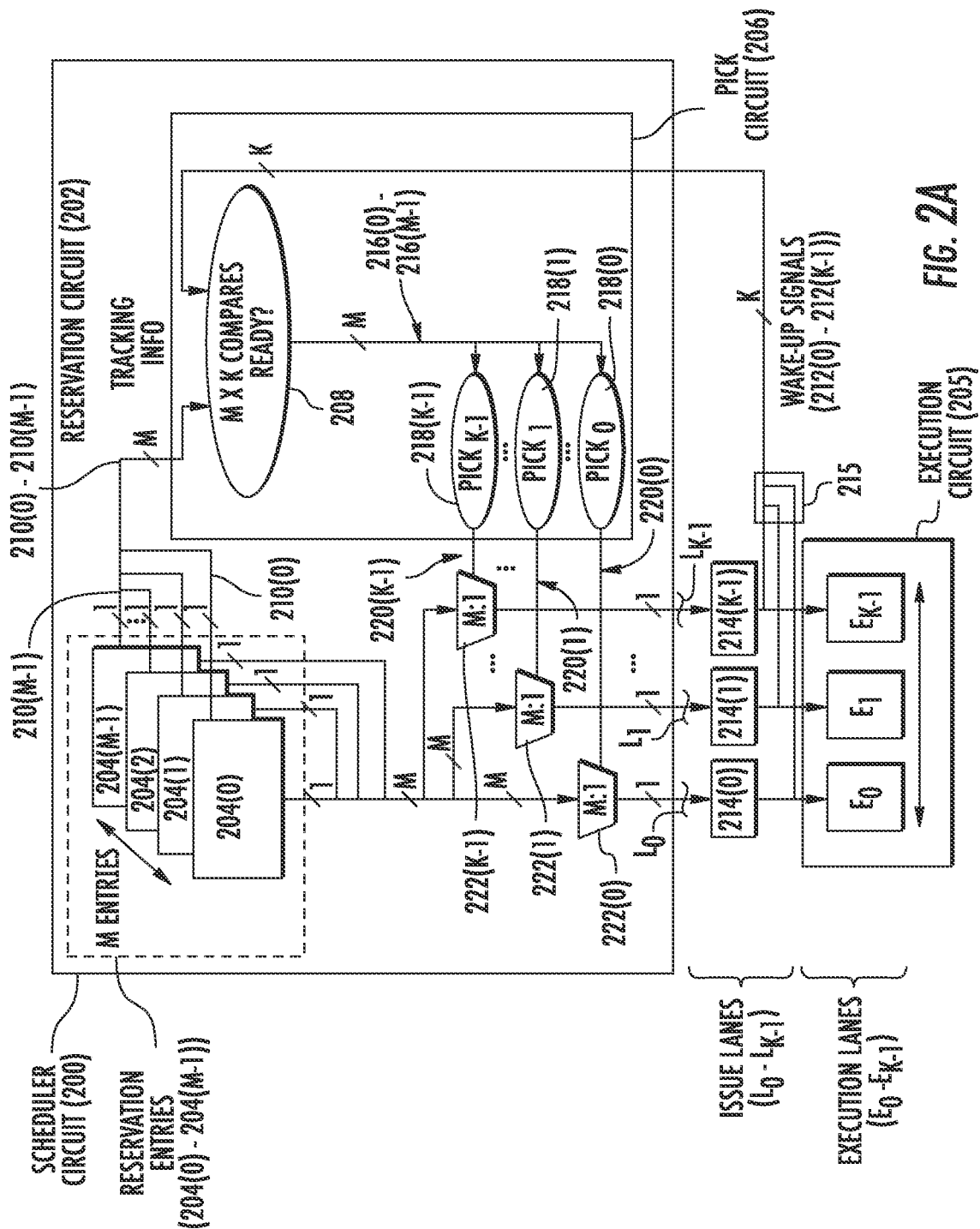
FIG. 2A is a diagram of an exemplary non-clustered scheduler circuit that can be included in an instruction processing circuit, including the instruction processing circuit in FIG. 1, and which is configured to schedule issuance of instructions to issue lanes to be executed by an execution circuit.
Figures 1, 2B:
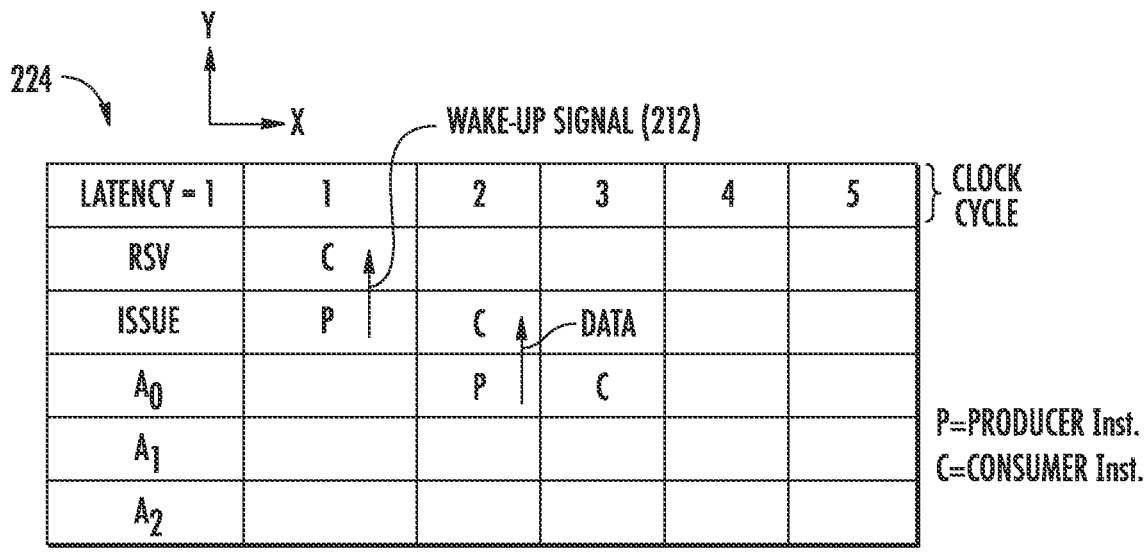
Figures 2, 2B:
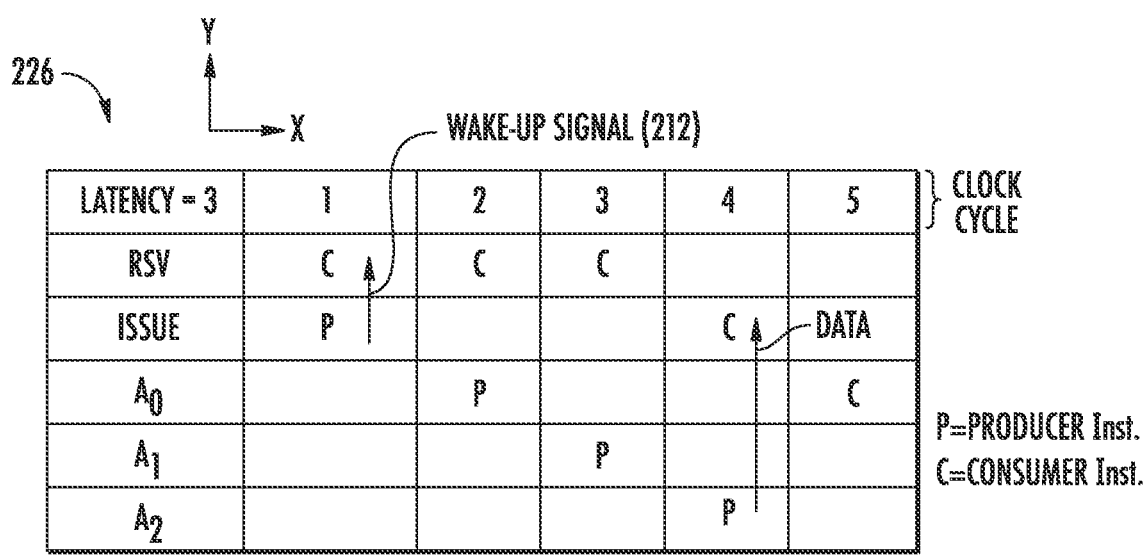
Figure 3A:
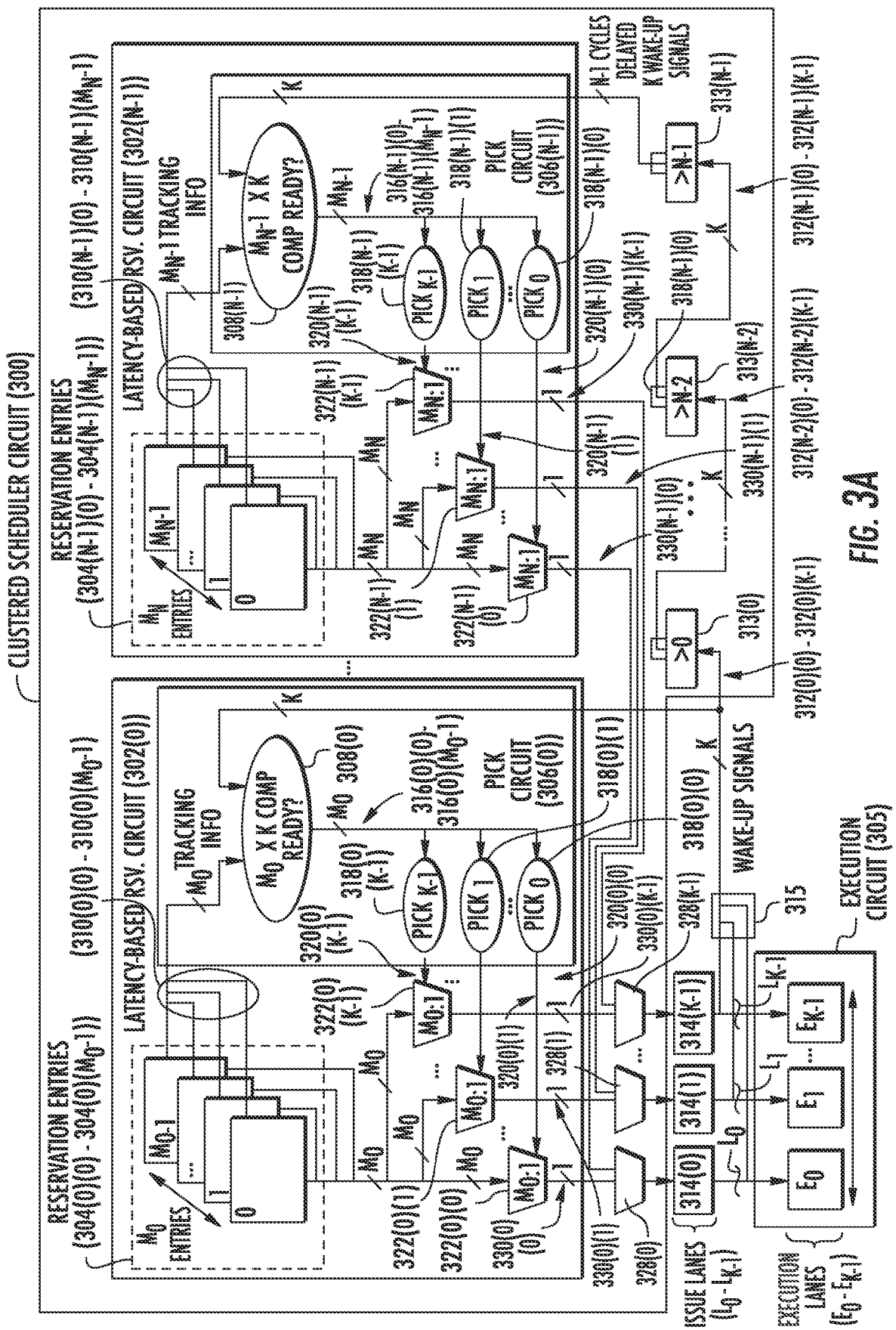
Figures 1, 3B:
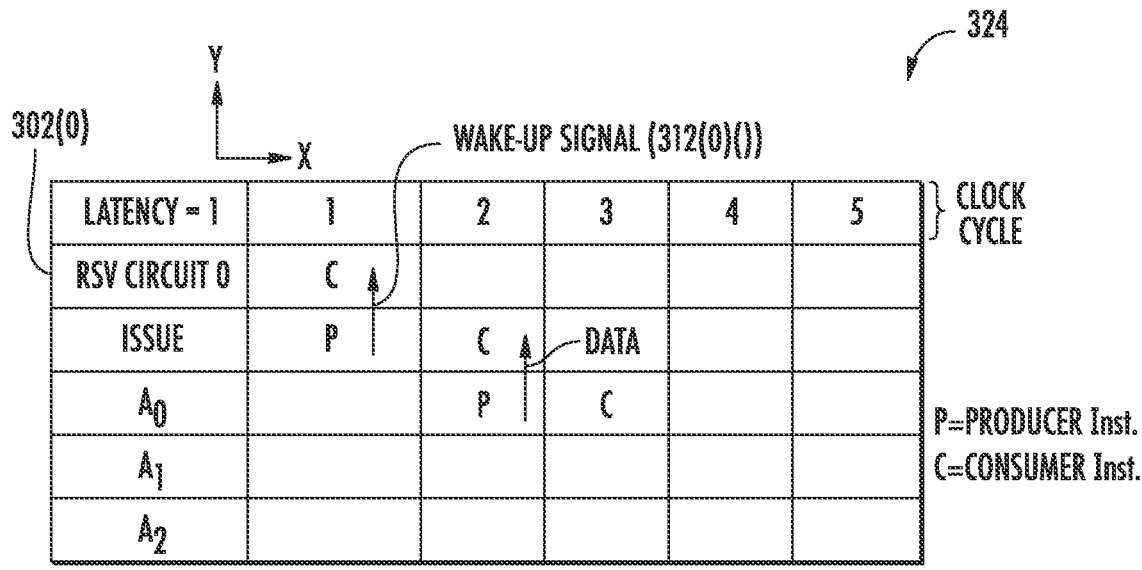
Figures 2, 3B:
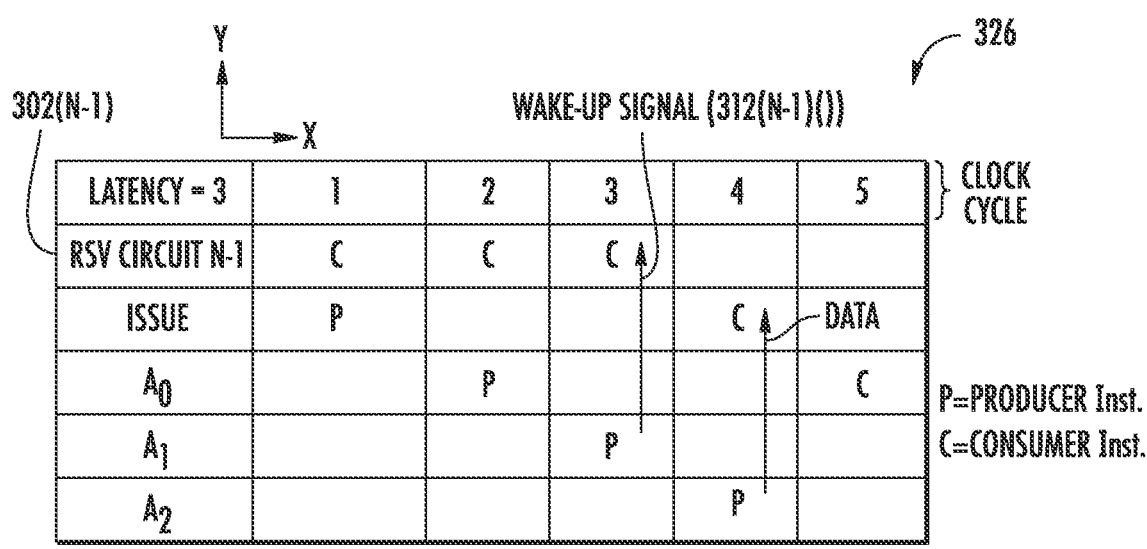
Figure 4A:
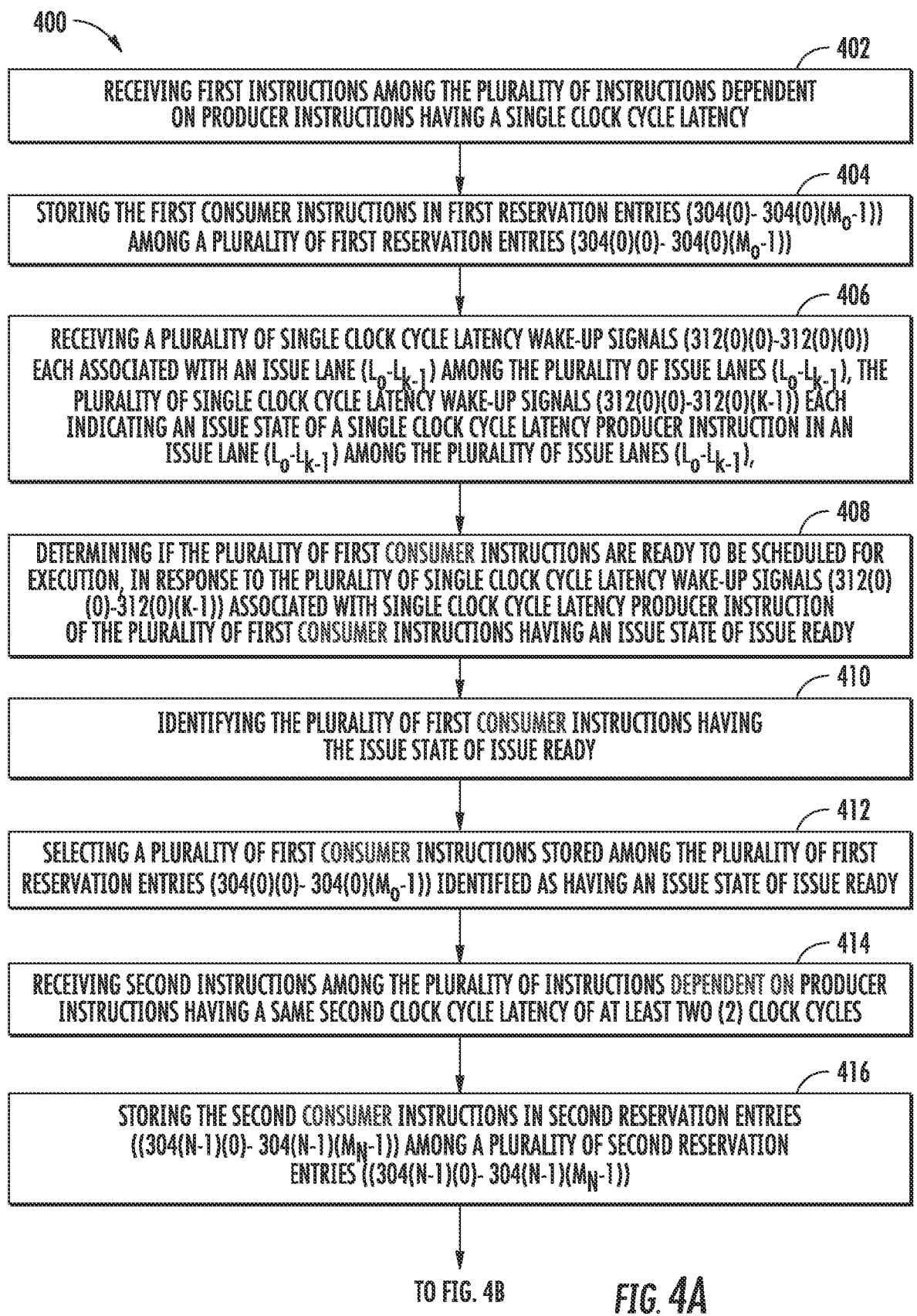
Figure 4B:
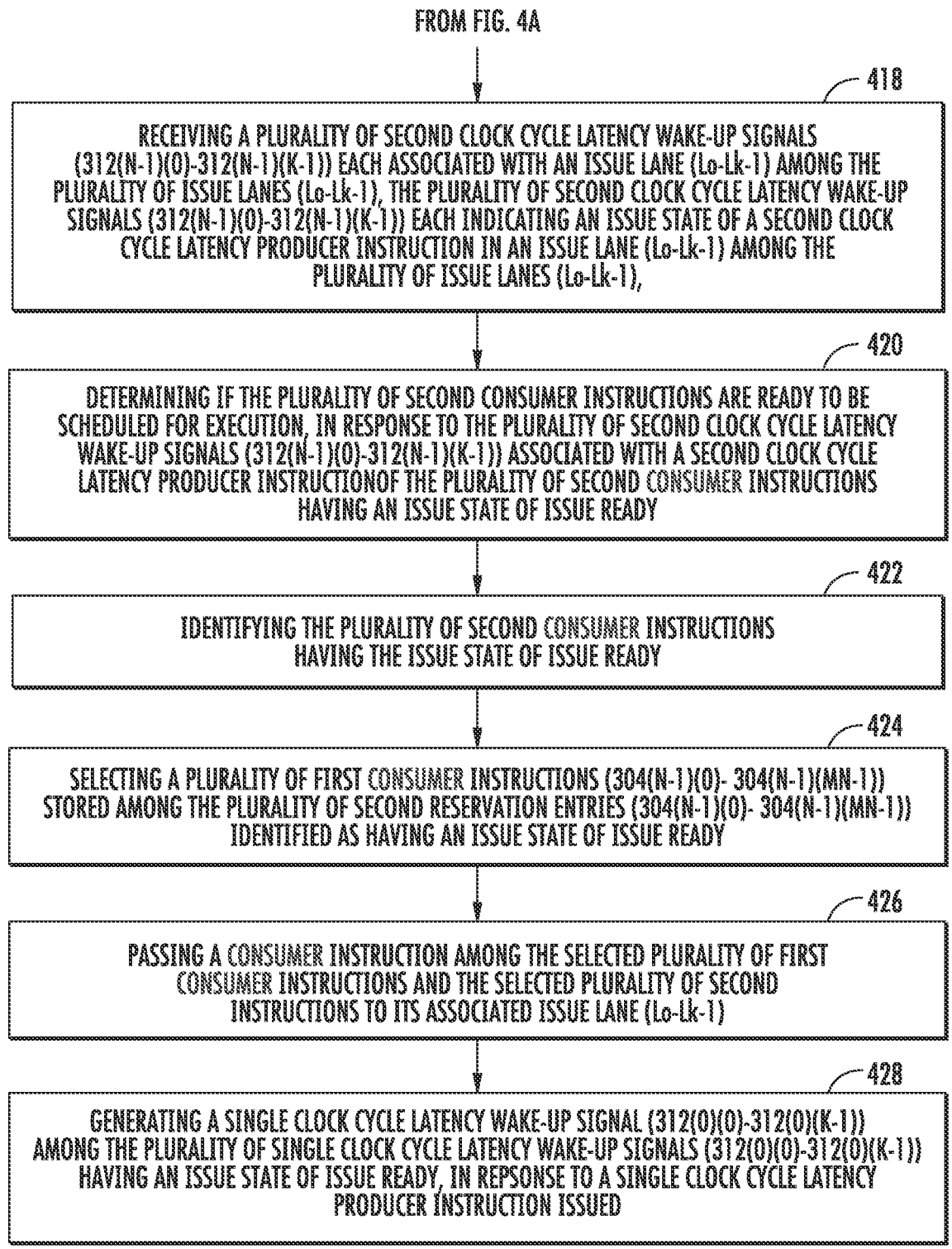
Figure 4C:
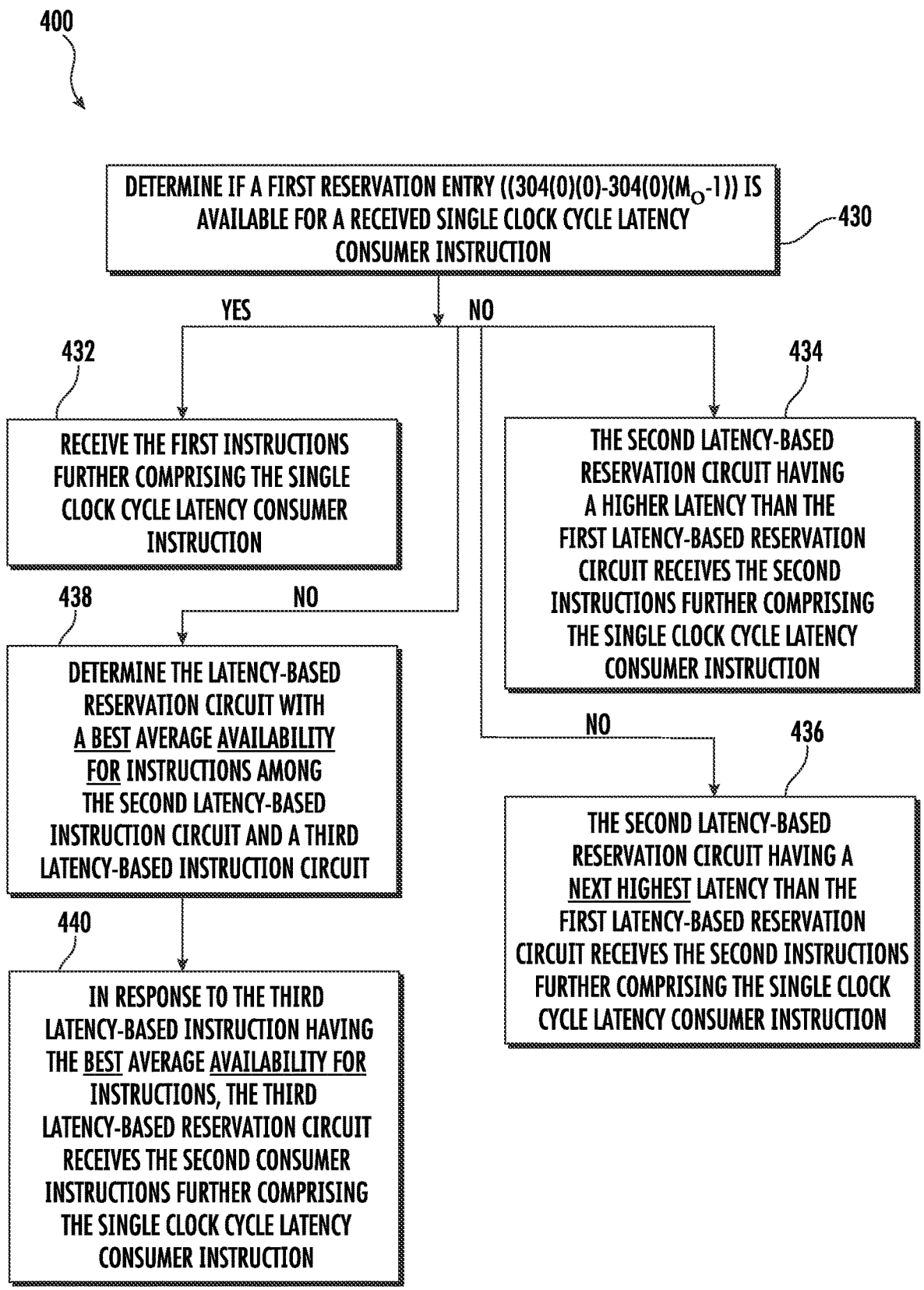
Figure 5A:
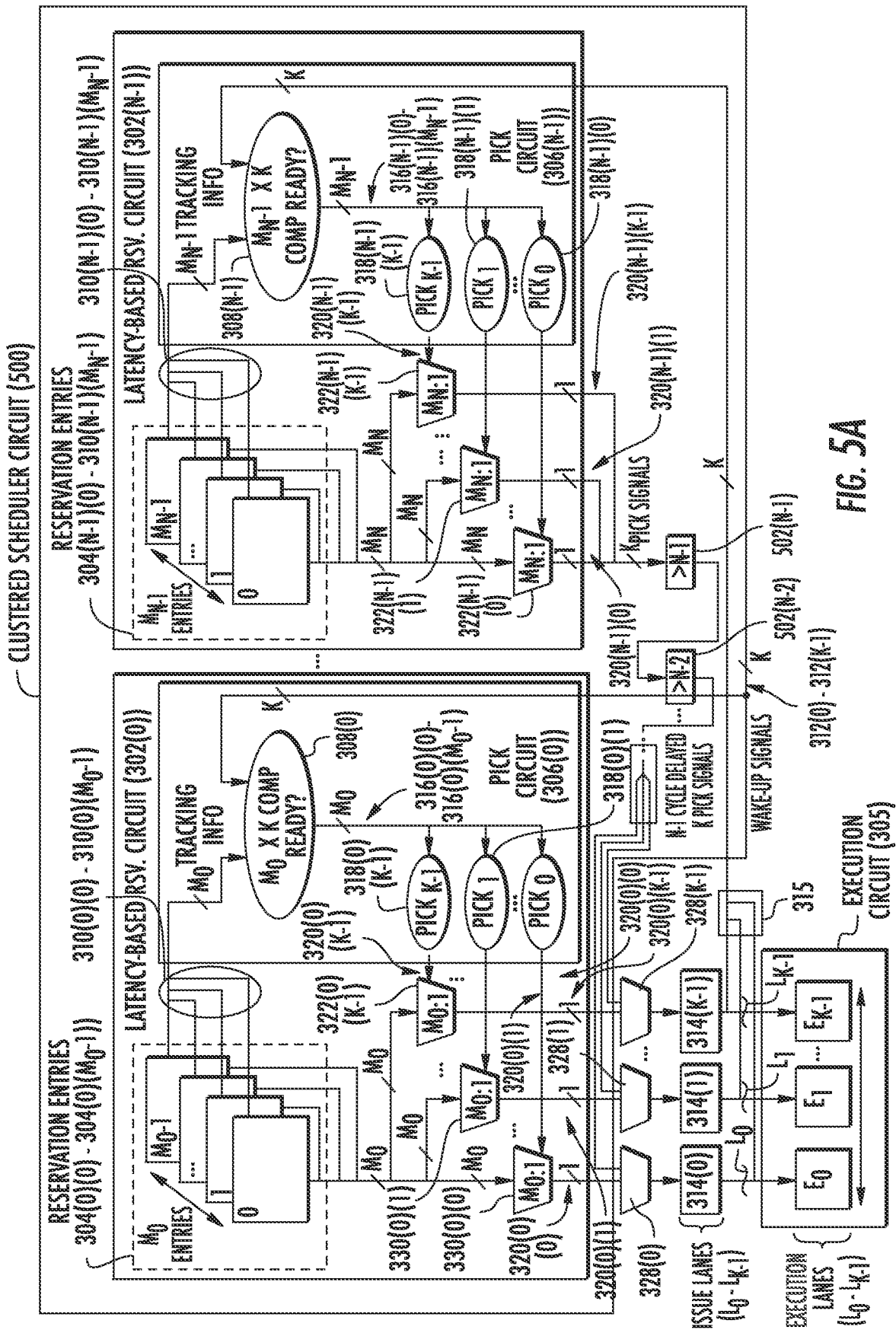
Figures 1, 5B:
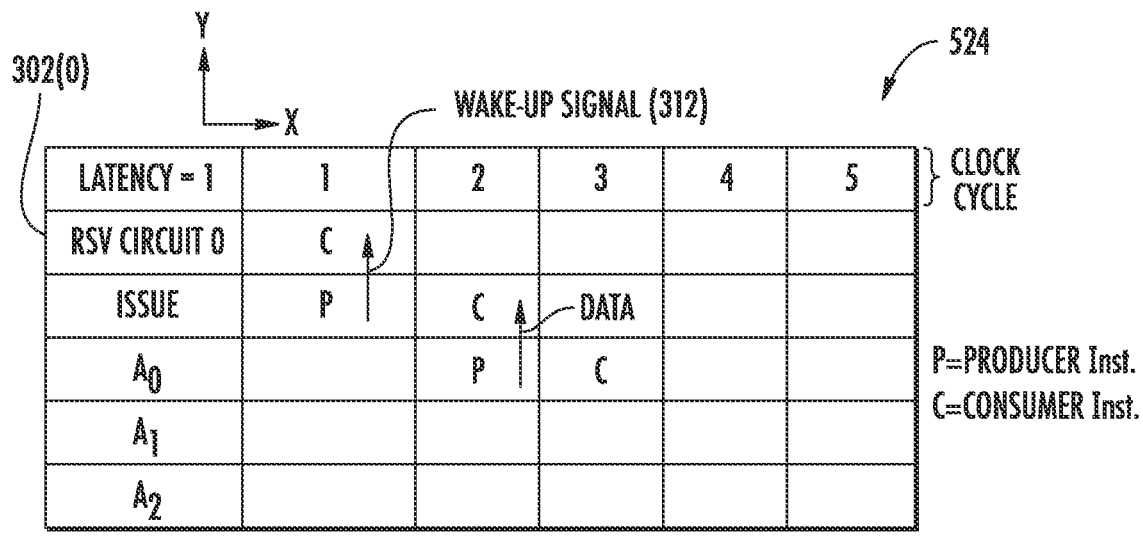
Figures 2, 5B:
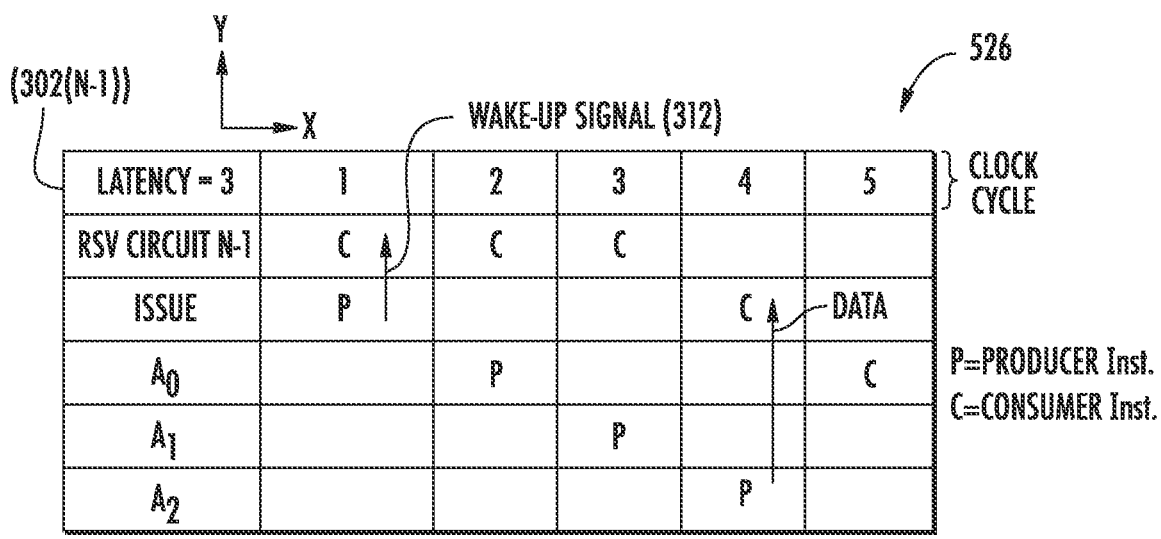
Figure 6A:
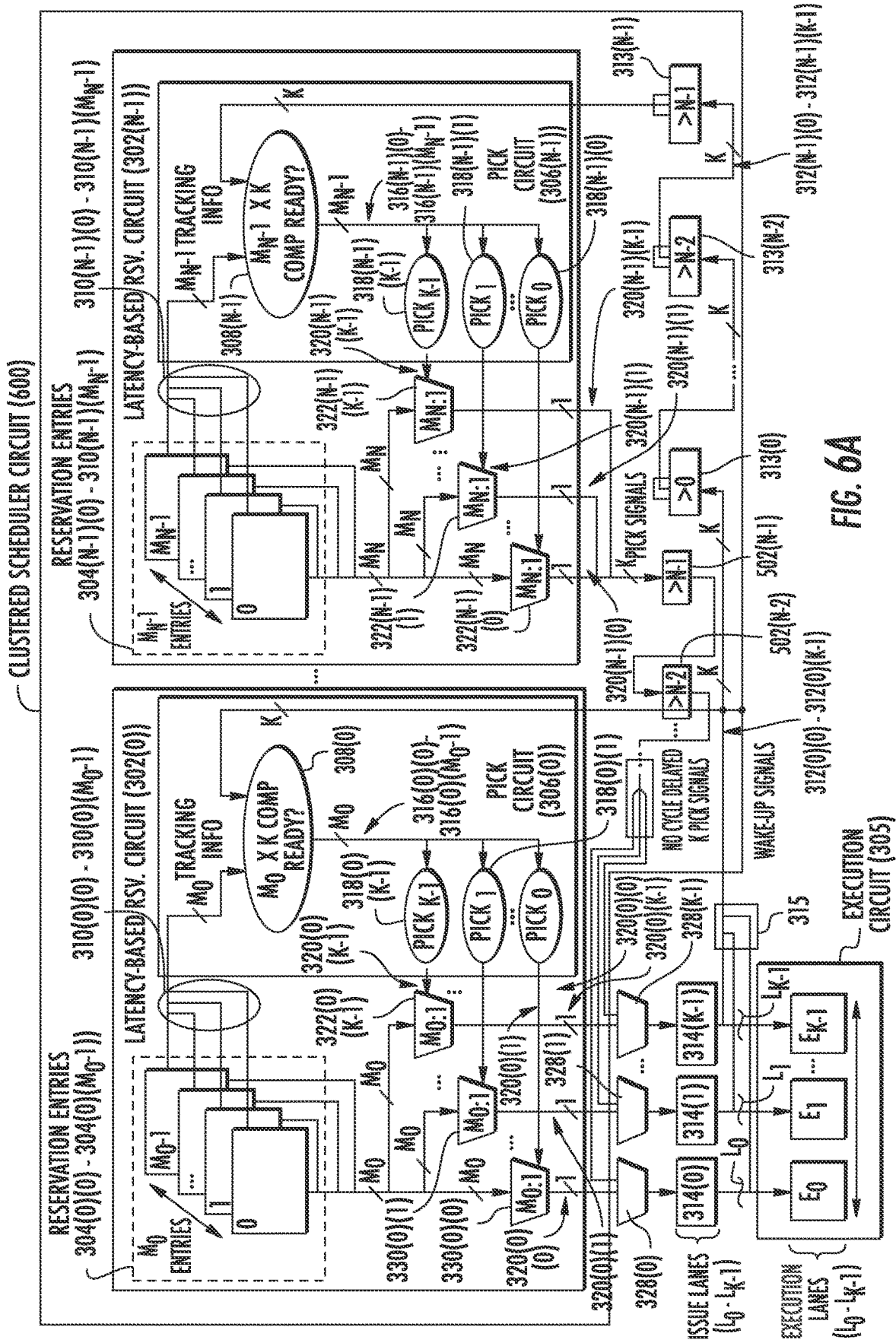
Figures 1, 6B:
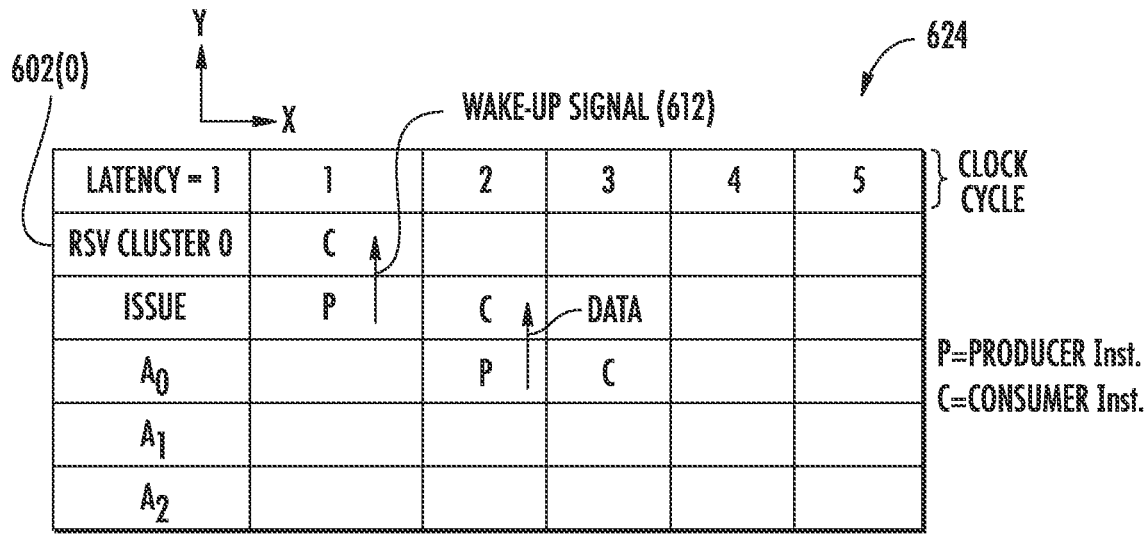
Figures 2, 6B:
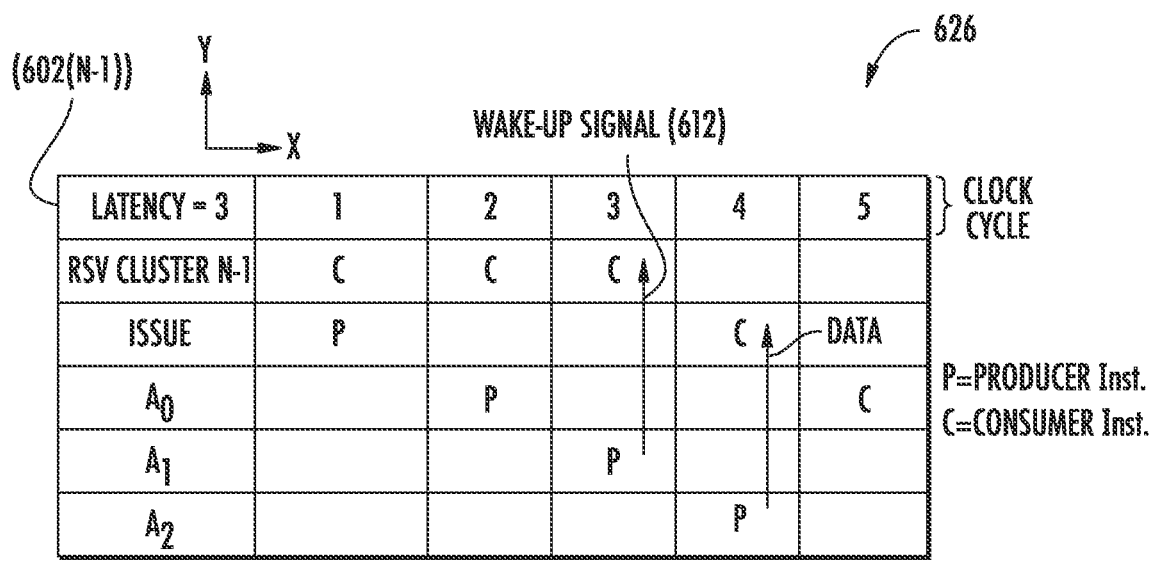
Figure 7:
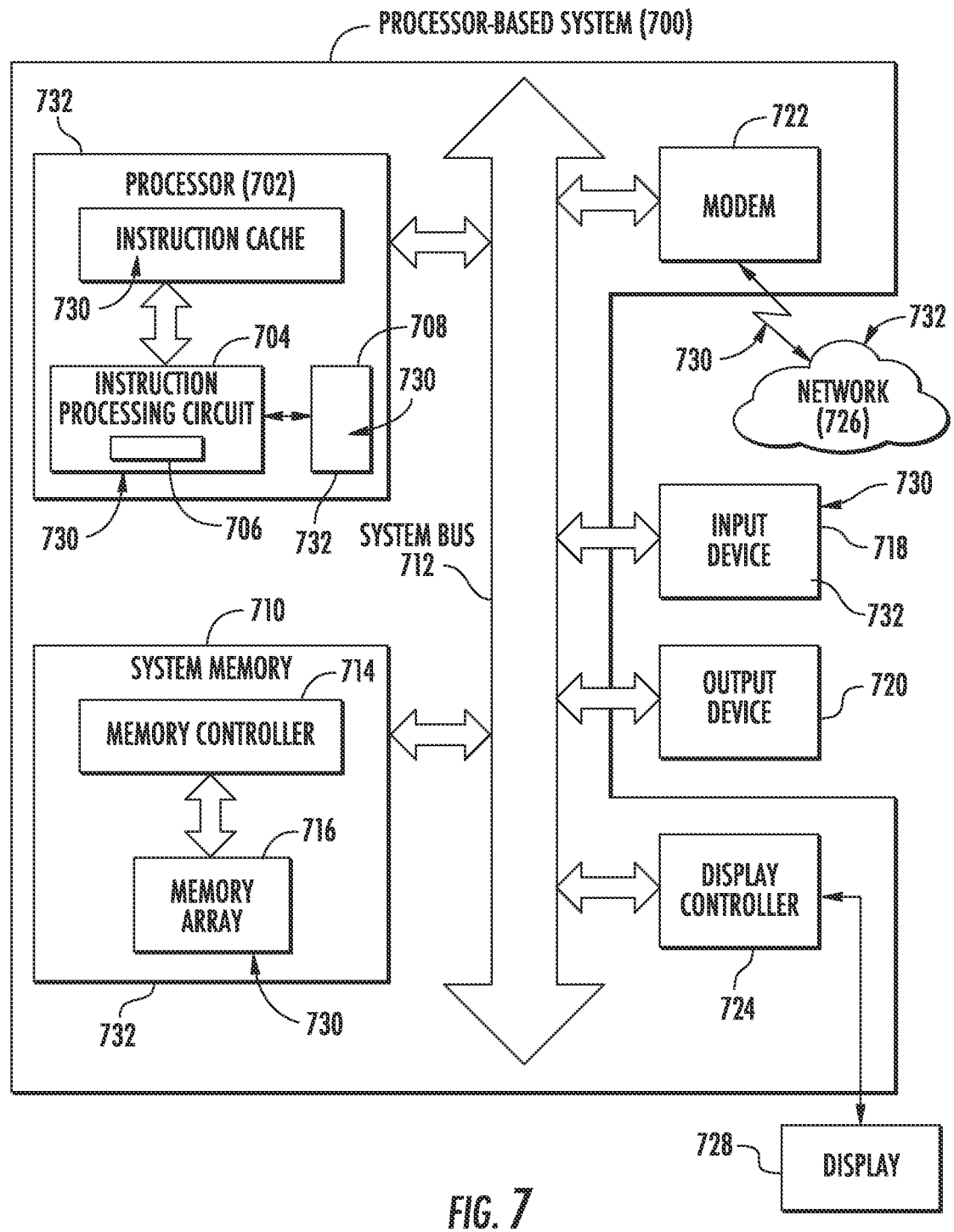

FIG. 3A is a diagram of an exemplary latency-based instruction reservation clustered scheduler circuit ("clustered scheduler circuit") that includes a plurality of latency-based reservation circuits each configured to cluster the same cycle-latency consumer instructions scheduled for issuance by respective pick circuits to common issue lanes for execution by an execution circuit, wherein the clustered scheduler circuit includes a plurality of wake-up signal registers, each associated with a latency-based reservation circuit and configured to store cycle-delayed wake-up signals generated from the issue lanes used by the respective pick circuits to wake up instructions in its respective latency-based reservation circuit;

FIG. 3B-1 is a timing diagram illustrating an exemplary clock-cycle timing of reservation, issuance, and execution of a single-clock cycle latency consumer instruction and consumer instruction in the clustered scheduler circuit in FIG. 3A;

FIG. 3B-2 is a timing diagram illustrating an exemplary clock-cycle timing of reservation, issuance, and execution of a 3-clock cycle latency producer instruction and consumer instruction in the clustered scheduler circuit in FIG. 3A;

FIGS. 4A and 4B are a flowchart illustrating an exemplary process of a clustered scheduler circuit in an instruction processing circuit in a processor assigning consumer instructions to a latency-based reservation circuit based on the cycle-latency of its producer instruction, and scheduling issuance of instructions in the latency-based reservation circuits to common issue lanes to be executed in an execution circuit;

FIG. 4C is a flowchart illustrating additional exemplary processes of a clustered scheduler circuit in an instruction processing circuit in a processor handling assignment of consumer instructions to latency-based reservation circuits based on the cycle-latency of its producer instruction and based on availability of the to latency-based reservation circuits;

FIG. 5A is a diagram of another exemplary clustered scheduler circuit that includes a plurality of latency-based reservation circuits each configured to cluster the same cycle-latency consumer instructions scheduled for issuance by respective pick circuits to common issue lanes for execution by an execution circuit, wherein the clustered scheduler circuit includes a plurality of pick signal registers each associated with a latency-based reservation circuit and configured to store cycle-delayed pick signals generated from the respective latency-based reservation circuits to pick which instructions from the latency-based reservation circuits are issued to the common issue lanes;

FIG. 5B-1 is a timing diagram illustrating an exemplary clock-cycle timing of reservation, issuance, and execution of a single-clock cycle latency producer instruction and consumer instruction in the clustered scheduler circuit in FIG. 5A;

FIG. 5B-2 is a timing diagram illustrating an exemplary clock-cycle timing of reservation, issuance, and execution of a 3-clock cycle latency producer instruction and consumer instruction in the clustered scheduler circuit in FIG. 5A;

FIG. 6A is a diagram of another exemplary clustered scheduler circuit that includes a plurality of latency-based reservation circuits each configured to cluster the same cycle-latency consumer instructions scheduled for issuance by respective pick circuits to common issue lanes for execution by an execution circuit, wherein the clustered scheduler circuit includes a plurality of wake-up signal registers each associated with a respective latency-based reservation circuit similar to the clustered scheduler circuit in FIG. 3A, and a plurality of pick signal registers each associated with a respective latency-based reservation circuit similar to the clustered scheduler circuit in FIG. 5A;

FIG. 6B-1 is a timing diagram illustrating an exemplary clock-cycle timing of reservation, issuance, and execution of a single-clock cycle latency producer instruction and consumer instruction in the clustered scheduler circuit in FIG. 6A;

FIG. 6B-2 is a timing diagram illustrating an exemplary clock-cycle timing of reservation, issuance, and execution of a 3-clock cycle latency producer instruction and consumer instruction in the clustered scheduler circuit in FIG. 6A; and FIG. 7 is a block diagram of an exemplary processor-based system that includes a processor with an instruction processing circuit that includes a latency-based clustered scheduler circuit that includes a plurality of latency-based reservation circuits each configured to cluster the same cycle-latency consumer instructions scheduled for issuance by respective scheduler circuits to common issue lanes for execution by an execution circuit, including but not limited to the latency-based clustered scheduler circuits in FIGS. 3A, 5A, and 6A.

DETAILED DESCRIPTION

Exemplary aspects disclosed herein include latency-based instruction reservation clustering in a scheduler circuit in a processor. The processor includes an instruction processing circuit that includes a number of instruction processing stages configured to pipeline the processing and execution of fetched instructions according to a dataflow execution. A scheduler circuit is included in an instruction processing stage in the instruction processing circuit to schedule issuance of instructions to the execution circuit to be executed. The scheduler circuit is responsible for issuing an instruction into an issue lane for execution by the execution circuit once it is known that the necessary values for the operand(s) of the instruction will be available when the instruction is executed. Thus, a consumer instruction is issued by the scheduler circuit once it is known that a necessary produced value(s) from a producer instruction(s) will be available before the consumer instruction is executed. The latency of the producer instruction is the number of clock cycles ("cycles") after its issuance that its produced value will be available to be consumed by the consumer instruction. The scheduler circuit should ideally be designed such that a consumer instruction that is dependent on a single-cycle latency producer instruction can be issued in back-to-back clock cycles with the producer instruction for performance. Also, it may be desired to increase the number of the reservation entries in the scheduler circuit to increase scheduling performance, because increasing reservation entries increases the likelihood there will be sufficient instructions ready to be issued in each of the issue lanes. However, increasing the reservation entries in the scheduler circuit increases the number of scheduling path connections and complexity in the scheduler circuit, thus increasing scheduling latency. The scheduling latency may increase such that all single-cycle latency producer instructions may not be able to be issued by the scheduler circuit in back-to-back clock cycles with the producer instruction.

Thus, in exemplary aspects disclosed herein, a latency-based clustered scheduler circuit ("clustered scheduler circuit") is provided in an instruction processing circuit of a processor that includes a plurality of latency-based reservation circuits. Each latency-based reservation circuit has an assigned producer instruction cycle latency so that consumer instructions received in the scheduler circuit that are dependent on producers with a specific cycle latency can be clustered in the same latency-based reservation circuit. For example, consumer instructions dependent on single-cycle latency producer instructions will be clustered together in the same latency-based reservation circuit that has a designated one (1) clock cycle latency. As another example, consumer instructions dependent on producer instructions that have a three-cycle latency will be clustered together in another latency-based reservation circuit that is designated to reserve for issuance for three (3) clock cycle latency producer instructions. In this manner, the number of reservation entries in the clustered scheduler circuit is distributed among the plurality of latency-based reservation circuits to avoid or reduce an increase in the number of scheduling path connections and complexity in each reservation circuit to avoid or reduce an increase in scheduling latency for a given number of reservation entries. The scheduling path connections are reduced for a given number of reservation entries over a non-clustered pick circuit, because signals (e.g., wake-up signals, pick-up signals) used for scheduling instructions to be issued in each latency-based reservation circuit do not have to have the same clock cycle latency so as to not impact performance. For example, a latency-based reservation circuit that has an assigned cycle-latency of two (2) clock cycles does not have to schedule a consumer instruction back-to-back clock cycle with the issuance of a producer instruction, because the producer instruction will not generate a produced result in one (1) clock cycle. Thus, these signals used by the latency-based reservation circuits for scheduling of instructions can be isolated from each other, and having with different cycle-latencies, thus only having to be coupled to their respective latency-based reservation circuits, thus reducing connection complexity. For example, signals used to schedule instructions in a two (2) cycle latency-based reservation circuit can have a clock-cycle latency of two (2) clock cycles without affecting scheduling performance. However, a latency-based reservation circuit that has an assigned cycle-latency of one (1) clock cycle can only schedule a consumer instruction back-to-back clock cycle with issuance the of a producer instruction if signals used to schedule such instructions do not have a clock-cycle latency greater than one (1) clock cycle.

FIG. 1 is a schematic diagram of an exemplary processor-based system 100 that includes a processor 102. As discussed in more detail below, the processor 102 includes an instruction processing circuit 104 that includes with one or more instruction pipelines $I_0$-$I_N$ for processing computer instructions for execution. As will be discussed in more detail below, the instruction processing circuit 104 includes a scheduler circuit 106 configured to store and schedule issuance of instructions to an execution circuit 108 to be executed. As will also be discussed in more detail below, the scheduler circuit 106 can be a latency-based instruction reservation clustered scheduler circuit ("clustered scheduler circuit") that includes a plurality of latency-based reservation circuits each configured to cluster the same cycle-latency consumer instructions scheduled for issuance to common issue lanes for execution by the execution circuit 108. The number of reservation entries needed to reserve instructions waiting for their operands to be ready to then be passed to the execution circuit 108 for execution is distributed among the plurality of latency-based reservation circuits to avoid or reduce an increase in the number of scheduling path connections and complexity in each reservation circuit to avoid or reduce an increase in scheduling latency for a given number of reservation entries.

With reference to FIG. 1, the processor 102 may be an in-order or an out-of-order processor (OoP) as examples. The processor 102 includes the instruction processing circuit 104. The instruction processing circuit 104 includes an instruction fetch circuit 110 that is configured to fetch instructions 112 from an instruction memory 114. The instruction memory 114 may be provided in or as part of a system memory in the processor-based system 100 as an example. An instruction cache 116 may also be provided in the processor 102 to cache the instructions 112 fetched from the instruction memory 114 to reduce latency in the instruction fetch circuit 110. The instruction fetch circuit 110 in this example is configured to provide the instructions 112 as fetched instructions 112F into the one or more instruction pipelines $I_0$-$I_N$ as an instruction stream 118 in the instruction processing circuit 104 to be pre-processed, before the fetched instructions 112F reach the execution circuit 108 to be executed. The fetched instructions 112F in the instruction stream 118 include producer instructions and consumer instructions that consume produced values as a result of the instruction processing circuit 104 executing producer instructions. The instruction pipelines $I_0$-$I_N$ are provided across different processing circuits or stages of the instruction processing circuit 104 to pre-process and process the fetched instructions 112F in a series of steps that can be performed concurrently to increase throughput prior to execution of the fetched instructions 112F by the execution circuit 108. For example, fetched store-based instructions 112F identified as having store-forward loads in the instruction stream 118 can be identified by a store forward load tracker circuit 120 in the instruction processing circuit 104 before being executed to be forwarded to be consumed by fetched consuming load-based instructions 112F.

A control flow prediction circuit 122 (e.g., a branch prediction circuit) is also provided in the instruction processing circuit 104 in the processor 102 in FIG. 1 to speculate or predict the outcome of a predicate of a fetched conditional control instruction 112F, such as a conditional branch instruction, that affects the instruction control flow path of the instruction stream 118 processed in the instruction pipelines $I_0$-$I_N$. The prediction of the control flow prediction circuit 122 can be used by the instruction fetch circuit 110 to determine the next fetched instructions 112F to fetch based on the predicted target address. The instruction processing circuit 104 also includes an instruction decode circuit 124 configured to decode the fetched instructions 112F fetched by the instruction fetch circuit 110 into decoded instructions 112D to determine the instruction type and actions required. The instruction type and action required encoded in the decoded instruction 112D may also be used to determine in which instruction pipeline $I_0$-$I_N$ the decoded instructions 112D should be placed. In this example, the decoded instructions 112D are placed in one or more of the instruction pipelines $I_0$-$I_N$ and are next provided to a rename circuit 126 in the instruction processing circuit 104. The rename circuit 126 is configured to determine if any register names in the decoded instructions 112D need to be renamed to break any register dependencies that would prevent parallel or out-of-order processing. The rename circuit 126 is configured to call upon a register map table (RMT) 128 to rename a logical source register operand and/or write a destination register operand of a decoded instruction 112D to available physical registers 130(1)-130(X) ($P_0$, $P_1$, . . . , $P_X$) in a physical register file (PRF) 132. The RMT 128 contains a plurality of mapping entries each mapped to (i.e., associated with) a respective logical register $R_0$-$R_P$. The mapping entries are configured to store information in the form of an address pointer to point to a physical register 130(1)-130(X) in the physical register file (PRF) 132. Each physical register 130(1)-130(X) in the PRF 132 contains a data entry configured to store data for the source and/or destination register operand of a decoded instruction 112D.

The instruction processing circuit 104 in the processor 102 in FIG. 1 also includes a register access circuit 134 prior to the scheduler circuit 106. The register access circuit 134 is configured to access a physical register 130(1)-130(X) in the PRF 132 based on a mapping entry mapped to a logical register $R_0$-$R_P$ in the RMT 128 of a source register operand of a decoded instruction 112D to retrieve a produced value from an executed instruction 112E in the execution circuit 108. The register access circuit 134 is also configured to provide the retrieved produced value from an executed decoded instruction 112E as the source register operand of a decoded instruction 112D to be executed. Also, in the instruction processing circuit 104, the scheduler circuit 106 is provided in the instruction pipeline $I_0$-$I_N$ and is configured to store decoded instructions 112D in reservation entries until all source register operands for the decoded instruction 112D are available. For example, the scheduler circuit 106 is responsible for determining that the necessary values for operands of a decoded consumer instruction 112D are available before issuing the decoded consumer instruction 112D in an issue lane $L_0$-$L_{K-1}$ among 'K' issue lanes to the execution circuit 108 for execution. The scheduler circuit 106 issues decoded instructions 112D ready to be executed to the execution circuit 108. The number of issue lane $L_0$-$L_{K-1}$ is typically less than the number of reservation entries in the scheduler circuit 106, so the scheduler circuit 106 employs circuits to dispatch decoded instructions 112D ready to be executed in the issue lanes $L_0$-$L_{K-1}$ according to an issuance scheme. The issuance scheme may be based on the latency of the producer instruction that generates the produced value(s) for a source operand of a decoded instruction 112D. For example, a producer instruction that can be executed and its produced data made available by the execution circuit 108 in one (1) clock cycle is a single clock cycle latency producer instruction. The execution circuit 108 may include multiple execution stages to execute producer instructions that require more than one (1) clock cycle to be executed. The source operands of a decoded instruction 112D can include immediate values, values stored in memory, and produced values from other decoded instructions 112D that would be considered producer instructions to the consumer instruction. The execution circuit 108 is configured to execute decoded instructions 112D issued in an issue lane $L_0$-$L_{K-1}$ from the scheduler circuit 106. A write circuit 136 is also provided in the instruction processing circuit 104 to write back or commit produced values from executed instructions 112E to memory, such as the PRF 132, cache memory, or system memory.

FIG. 2A is a diagram of an exemplary scheduler circuit 200 that can be employed as the scheduler circuit 106 in the instruction processing circuit 104 in FIG. 1 to illustrate exemplary components of the scheduler circuit 200. The scheduler circuit 200 includes a reservation circuit 202 that includes an 'M' number of reservation entries 204(0)-204(M−1) in this example. The reservation entries 204(0)-204(M−1) are configured to store received instructions in an instruction pipeline(s) until ready to be executed in an execution circuit 205. The scheduler circuit 200 is configured to issue instructions ready to be executed to one of the issue lanes $L_0$-$L_{K-1}$ that are coupled to respective execution lanes $E_0$-$E_{K-1}$ in the execution circuit 205. The execution circuit 205 is designed to be able to receive and concurrently execute 'K' number of instructions dispatched in K issue lanes $L_0$-$L_{K-1}$, and K execution lanes $E_0$-$E_{K-1}$ are provided for increased performance. Thus, in this example, 'M' is referred to as the instruction window size, and 'K' is referred to as the issue width or the number of issue lanes $L_0$-$L_{K-1}$ in which producer instructions can be issued to the execution circuit 205 to be executed. If the scheduler circuit 200 was included as the scheduler circuit 106 in FIG. 1, the reservation entries 204(0)-204(M−1) would be configured to store decoded instructions 112D from the instruction pipelines $I_0$-$I_N$ before being passed to the execution circuit 108 to be executed. The reservation entries 204(0)-204(M−1) store producer instructions and consumer instructions of the producer instructions. The scheduler circuit 200 ensures that the producer instruction is issued to an issue lane $L_0$-$L_{K-1}$ to be executed by execution circuit 205 before its consumer instruction is issued in an issue lane $L_0$-$L_{K-1}$. The scheduler circuit 200 is a synchronous circuit that is configured to operate and execute functions in cycles of a clock signal of its processor.

With continuing reference to FIG. 2A, the scheduler circuit 200 also includes a pick circuit 206 that tracks the instructions in the reservation entries 204(0)-204(M−1) to determine when such instructions are ready to be issued. In this regard, each of the reservation entries 204(0)-204(M−1) are coupled to a readiness circuit 208 in the pick circuit 206 as indicated by the tracking lines 210(0)-210(M−1) that can each communicate tracking information about an instruction stored in a respective reservation entry 204(0)-204(M−1). The readiness circuit 208 is also coupled to K wake-up signals 212(0)-212(K−1) that are generated by K issue lane circuits 214(0)-214(K−1) in the respective issue lanes $L_0$-$L_{K-1}$. Each issue lane circuit 214(0)-214(K−1) associated with a respective issue lane $L_0$-$L_{K-1}$ is configured to generate a wake-up signal 212(0)-212(K−1) among the K wake-up signals 212(0)-212(K−1) on a wake-up signal port 215 in response to a producer instruction being issued in the respective issue lane $L_0$-$L_{K-1}$. The wake-up signal 212(0)-212(K−1) indicates an issue state as either issue ready or issue not ready. When a producer instruction is issued in an issue lane $L_0$-$L_{K-1}$ by the scheduler circuit 200, this means that it will be executed by the execution circuit 205 and its produced data resulting from execution available to be consumed by any consumer instruction of the producer instruction. The readiness circuit 208 in the pick circuit 206 is configured to compare the wake-up signals 212(0)-212(K−1) having an issue state indicating issue ready for issued producer instructions up to M instructions in the respective reservation entries 204(0)-204(M−1) to determine if any such instructions are ready to be executed. For example, if an instruction reservation entry 204(0)-204(M−1) is a consumer of the issued producer instruction, the issuance of its producer instructions indicated by a wake-up signal 212(0)-212(K−1) indicates that the data from the producer instruction will become available, and thus the consumer instruction can be issued if no other source operands are unavailable. The readiness circuit 208 is configured to generate M instruction ready signals 216(0)-216(M−1) indicating if an instruction in a respective reservation entry 204(0)-204(M−1) is ready to be issued based on the comparison of the wake-up signals 212(0)-212(K−1) for issued producer instructions to M instructions in the respective reservation entries 204(0)-204(M−1).

With continuing reference to FIG. 2A, the pick circuit 206 includes K pick circuits 218(0)-218(K−1) that are configured to receive the M instruction ready signals 216(0)-216(M−1) from the readiness circuit 208 and generate respective K issue lane pick signals 220(0)-220(K−1) to identify respective instructions in the reservation entries 204(0)-204(M−1) that are ready to be issued, indicated by an issue state being issue ready. Providing the M instruction ready signals 216(0)-216(M−1) to the K pick circuits 218(0)-218(K−1) involves multiplexing of signals if K is not equal to M. As discussed above, conventionally, K<M, because an execution circuit, such as execution circuit 205, is conventionally not designed to be able to execute M instructions concurrently, nor would such likely be necessary to achieve the desired performance as M instructions may not be ready to issue every clock cycle. The K issue lane pick signals 220(0)-220(K−1) are provided to K issue selection circuits 222(0)-222(K−1) in the reservation circuit 202 and are each coupled to a respective issue lane $L_0$-$L_{K-1}$. The issue selection circuits 220(0)-220(K−1) are each coupled to the reservation entries 204(0)-204(M−1) such that the M reservation entries 204(0)-204(M−1) are multiplexed into K issue selection circuits 220(0)-220(K−1) if K is not equal to M. The issue selection circuits 222(0)-222(K−1) are configured to select an instruction from a reservation entry 204(0)-204(M−1) to be issued in response to the instruction identified in the respective issue lane pick signals 220(0)-220(K−1) having an issue state of issue ready. The issue selection circuits 222(0)-222(K−1) are each configured to provide the identified instruction to be issued from the received respective issue lane pick signals 220(0)-220(K−1) to a respective associated issue lane $L_0$-$L_{K-1}$, which is then provided to a respective execution lane $L_0$-$L_{K-1}$ in the execution circuit 205 to be executed.

To further illustrate the issuance of instructions in the scheduler circuit 200 in FIG. 2A, timing diagrams in FIGS. 2B-1 and 2B-2 are provided. FIG. 2B-1 is a timing diagram 224 illustrating an exemplary clock-cycle timing of reservation, issuance, and execution of a single-clock cycle latency producer instruction and consumer instruction issued by the scheduler circuit 200 in FIG. 2A. FIG. 2B-2 is a timing diagram 226 illustrating an exemplary clock-cycle timing of reservation, issuance, and execution of a three (3) clock cycle latency producer instruction and consumer instruction issued by the scheduler circuit 200 in FIG. 2A.

With reference to FIG. 2B-1, the timing diagram 224 is shown in the form of a table that includes clock cycles 1, 2, 3, 4, and 5 along the X-axis and the pipeline stages in an instruction processing circuit along the Y-axis. The pipeline stages shown are RSV for a reservation stage shown in the scheduler circuit 200, ISSUE for an issue stage shown in the issue lanes $L_0$-$L_{K-1}$ in FIG. 2A, and execution stages $A_0$-$A_2$ illustrating up to three (3) execution stages in the execution circuit 205 that are executed over three (3) clock cycles. As previously discussed with regard to FIG. 1, some producer instructions are single clock cycle latency instructions in that their produced data is generated by the execution circuit, such as execution circuit 205 in one execution stage and thus one (1) clock cycle. Other producer instructions are multiple clock cycle latency instructions in that their produced data is generated by the execution circuit, such as execution circuit 205, in more than one execution stage and thus more than (1) clock cycle.

As shown in FIG. 2B-1, the timing diagram 224 includes a 'P' in clock cycle 1 ISSUE stage signifying a producer instruction in an issue lane $L_0$-$L_{K-1}$ in FIG. 2A that was previously issued by the scheduler circuit 200. Latency=1 means that the producer instruction is a one (1) clock cycle latency instruction. A consumer instruction signified by 'C' of the producer instruction P is also in clock cycle 1 indicating that a consumer instruction C is stored in a reservation entry 204(0)-204(M−1) in the reservation circuit 202 in FIG. 2A. In response to the producer instruction P being in an issue lane $L_0$-$L_{K-1}$ in clock cycle 1, a wake-up signal signified by wake-up signal 212 is generated and communicated to the pick circuit 206 in the scheduler circuit 200 to identify the producer instruction P having an issue state indicating issued. As shown in the timing diagram 224 in clock cycle 2, the producer instruction P is shifted to a first execution stage $A_0$ in the execution circuit 205 in FIG. 2A. The consumer instruction C is issued to an issue lane $L_0$-$L_{K-1}$ by the scheduler circuit 200 in FIG. 2A in back-to-back clock cycles with the producer instruction P. The ability to issue consumer instructions dependent on single clock cycle latency producer instructions in back-to-back clock cycles is highly efficient. Because the producer instruction P in this example is a single clock cycle latency producer instruction, the data generated by execution of the producer instruction P is available to the consumer instruction C in clock cycle 2. Thus, the consumer instruction C can consume the data in its execution that was generated by execution of producer instruction P in clock cycle 3.

The timing diagram 226 in FIG. 2B-2 also includes a producer instruction P in clock cycle 1 in an ISSUE stage in an issue lane $L_0$-$L_{K-1}$ in FIG. 2A that was previously issued by the scheduler circuit 200. Latency=3 means that the producer instruction P in FIG. 2B-2 is a three (3) clock cycle latency instruction, meaning that the producer instruction P will not be fully executed until the third execution stage $A_2$ in the execution circuit 205 in FIG. 2A. A consumer instruction C of the producer instruction P is also in clock cycle 1 indicating the consumer instruction C is stored in a reservation entry 204(0)-204(M−1) in the reservation circuit 202 in FIG. 2A. In response to the producer instruction P being in an issue lane $L_0$-$L_{K-1}$ in clock cycle 1, a wake-up signal signified by wake-up signal 212 is generated and communicated to the pick circuit 206 in the scheduler circuit 200 to identify the producer instruction P having an issue state indicating issued. As shown in the timing diagram 226 in FIG. 2B-2 in clock cycle 2, the producer instruction P is shifted to a first execution stage $A_0$ in the execution circuit 205 in FIG. 2A. The consumer instruction C is not issued to an issue lane $L_0$-$L_{K-1}$ by the scheduler circuit 200 in FIG. 2A, because the producer instruction P has not been fully executed. Because the producer instruction P in this example is a three (3) clock cycle latency producer instruction, the data generated by execution of the producer instruction P will only be available to the consumer instruction C in clock cycle 4. Thus, the consumer instruction C can consume the data in its execution that was generated by execution of producer instruction P in clock cycle 5. Thus, as shown in FIG. 2B-2, the wake-up signal 212 being generated in clock cycle 1 was not necessary, because the data from the execution of the producer instruction was not produced until clock cycle 4. Thus, the wake-up signal 212 could have been generated as late as clock cycle 3 and the data from the execution of the producer instruction would still be available to the consumer instruction in clock cycle 4.

With reference back to FIG. 2A, it may be desired to increase 'M' to provide for more reservation entries in the scheduler circuit 200 as well as a larger 'K' issue width for increased performance. As discussed above, an important part of the wake-up design in the scheduler circuit 200 is that a consumer instruction that is dependent on a single-cycle latency producer instruction can be issued by the scheduler circuit 200 in back-to-back clock cycles with the producer instruction. There are three main components of the wake-up timing path in the scheduler circuit 200 in FIG. 2A that affect a single-cycle wake-up timing path, which are: (1) latency in coupling K wake-up signals 212(0)-212(K-1) from K issue lanes $L_0$-$L_{K-1}$ to the pick circuit 206 as a result of up to K producer instructions being issued in the issue lanes $L_0$-$L_{K-1}$; (2) the scheduling latency of the scheme in which the pick circuit 206 picks up to K instructions to issue from the M entries in the reservation entries 204(0)-204(M-1) in the reservation circuit 202; and (3) the latency in coupling K issue lane pick signals 220(0)-220(K-1) issued by the pick circuit 206 for M entries in the reservation circuit 202 to cause up to instructions in the M reservation entries 204(0)-204(M<-1) to be issued in the K issue lanes $L_0$-$L_{K-1}$. It may be desired to increase the instruction window size M in the reservation circuit 202. The greater the instruction window size M, the more likely there are K available instructions that are always ready to be issued in the K issue lanes $L_0$-$L_{K-1}$ to maximize the efficiency of the execution circuit 205. However, increasing the instruction window size M in the scheduler circuit 200 in FIG. 2A for increased performance can have an adverse effect on latency of all three (3) components of the wake-up timing path in the scheduler circuit 200. Increasing instruction window size M increases the number of endpoints that the K wake-up signals 212(0)-212(K-1) need to be broadcast to in the pick circuit 206, which can increase capacitive and resistive loading in the wake-up timing path, thus increasing delay. Also, increasing the number of K issue lanes $L_0$-$L_{K-1}$ increases the number of wake-up signals 212(0)-212(K-1) coupled to the pick circuit 206, which also increases the capacitive and resistive loading on the pick circuit 206 and in the wake-up timing path, and thus can increase latency of the pick circuit 206.

FIG. 3A is a diagram of an exemplary latency-based instruction reservation clustered scheduler circuit 300 ("clustered scheduler circuit" 300) that includes a plurality (N number) of latency-based reservation circuits 302(0)-302(N-1), as opposed to one reservation circuit like in the scheduler circuit 200 in FIG. 2A. The clustered scheduler circuit 300 can be employed as the scheduler circuit 106 in the instruction processing circuit 104 in FIG. 1. As will be discussed in more detail below, each latency-based reservation circuit 302(0)-302(N-1) is configured to cluster the same cycle-latency consumer instructions scheduled for issuance to issue lanes for execution by an execution circuit. For example, consumer instructions that are dependent on and thus have a single-cycle latency can be clustered together in the same latency-based reservation circuit 302(0) that is designated to reserve for one (1) clock cycle latency consumer instructions to be issued. Consumer instructions that are dependent on and thus have a three (3) clock cycle latency can be clustered together in another latency-based reservation circuit 302(N-1) that is designated to reserve for three (3) clock cycle latency consumer instructions to be issued, for example. In this manner, the overall number of reservation entries in the clustered scheduler circuit 300 can distributed among the N latency-based reservation circuits 302(0)-302(N-1) to avoid or reduce an increase in the number of scheduling path connections and complexity in each latency-based reservation circuit 302(0)-302(N-1) to avoid or reduce an increase in scheduling latency for a given overall number of reservation entries. The scheduling path connections are reduced for a given number of reservation entries over a non-clustered pick circuit like scheduler circuit 200 in FIG. 2A, because signals (e.g., wake-up signals, issue lane pick signals) used for scheduling instructions to be issued in each latency-based reservation circuit 302(0)-302(N-1) do not have to have the same clock cycle latency so as to not impact performance. For example, if latency-based reservation circuit 302(1) has an assigned cycle-latency of two (2) clock cycles, producer instructions stored in reservation entries in latency-based reservation circuit 302(1) do not have to issue a consumer instruction in back-to-back clock cycles with issuance of a producer instruction, because the producer instruction will not generate data in one (1) clock cycle.

Thus, signals used by the latency-based reservation circuits 302(0)-302(N-1) for scheduling of instructions can be isolated from each other with different cycle-latencies, thus only having to be coupled to its respective latency-based reservation circuit 302(0)-302(N-1), thus reducing connection complexity. For example, signals used to schedule instructions in a three (3) cycle latency-based reservation circuit can have a clock-cycle latency of three (3) clock cycles without affecting scheduling performance. However, a latency-based reservation circuit 302(0)-302(N-1) that has an assigned cycle-latency of one (1) clock cycle can only schedule a consumer instruction in back-to-back clock cycles with issuance of a producer instruction if the schedule timing path used to schedule such instructions does not have a clock-cycle latency greater than one (1) clock cycle.

In this regard, with reference to FIG. 3A, the clustered scheduler circuit 300 includes an N number of latency-based reservation circuits 302(0)-302(N-1). Latency-based reservation circuit 302(0) includes an '$M_0$' number of reservation entries 304(0)(0)-304(0)($M_0$-1), in this example. Latency-based reservation circuit 302(N-1) includes an '$M_N$-1' number of reservation entries 304(N-1)(0)-304(N-1)($M_N$-1) in this example. Only two (2) latency-based reservation circuits 302(0)-302(N-1) are shown, but note that any number of N latency-based reservation circuits can be included in the clustered scheduler circuit 300. The reservation entries 304(0)(0)-304(0)($M_0$-1)-304(N-1)(0)-304(N-1)($M_N$-1) in the respective latency-based reservation circuits 302(0)-302(N-1) are configured to store received instructions, including consumer instructions, until ready to be executed in an execution circuit 305. The clustered scheduler circuit 300 is configured to issue instructions, including consumer instructions, ready to be executed to one of the issue lanes $L_0$-$L_{K-1}$ that are coupled to execution lanes $E_0$-$E_{K-1}$ in the execution circuit 305 be executed. The execution circuit 205 is designed to be able to receive and concurrently execute 'K' number of instructions dispatched in common K issue lanes $L_0$-$L_{K-1}$, and K execution lanes $E_0$-$E_{K-1}$ are provided for increased performance. Thus, in this example, $M_0$ is the instruction window size of latency-based reservation circuit 302(0), $M_{N-1}$ is the instruction window size of latency-based reservation circuit 302(N−1), and 'K' is referred to as the issue width or the number of issue lanes $L_0$-$L_{K-1}$ in which producer instructions can be issued to the execution circuit 305 to be executed. Thus, the instruction window size of the entire clustered scheduler circuit 300 is divided among the latency-based reservation circuits 302(0)-302(N−1). If the clustered scheduler circuit 300 was included as the scheduler circuit 106 in FIG. 1, the reservation entries 304(0)(0)-304(0)($M_0$−1)-304(N−1)(0)-204(N−1)($M_N$−1) would be configured to store decoded instructions 112D from the instruction pipelines $I_0$-$I_N$ before being passed to the execution circuit 108 to be executed. The reservation entries 304(0)(0)-304(0)($M_0$−1)-304(N−1)(0)-304(N−1)($M_N$−1) store producer instructions and consumer instructions of the producer instructions based on the clock cycle latency. For example, latency-based reservation circuit 302(0) may be designated for reserving consumer instructions having a cycle-latency of one (1) clock cycle, whereas latency-based reservation circuit 302(N−1) may be designated for reserving consumer instructions having a cycle-latency of three (3) clock cycles. The clustered scheduler circuit 300 ensures that the producer instruction is issued from its latency-based reservation circuit 302(0)-302(N−1) to an issue lane $L_0$-$L_{K-1}$ to be executed by the execution circuit 305 before its consumer instruction is issued in an issue lane $L_0$-$L_{K-1}$. The clustered scheduler circuit 300 is a synchronous circuit that is configured to operate and execution functions in cycles of a clock signal of its processor.

With continuing reference to FIG. 3A, each latency-based reservation circuit 302(0)-302(N−1) includes a respective pick circuit 306(0)-306(N−1) that tracks the instructions in the respective reservation entries 304(0)(0)-304(0)($M_0$−1)-304(N−1)(0)-304(N−1)($M_N$−1) to determine when such instructions are ready to be issued. In this regard, each of the reservation entries 304(0)(0)-304(0)($M_0$−1)-304(N−1)(0)-304(N−1)($M_N$−1) are coupled to a respective readiness circuit 308(0)-308(N−1) in the respective pick circuits 306(0)-306(N−1) as indicated by the tracking lines 310(0)(0)-310($M_0$−1)-310(N−1)(0)-310(N−1)($M_N$−1) that each can communicate tracking information about an instruction stored in a respective reservation entry 304(0)(0)-304(0)($M_0$−1)-304(N−1)(0)-304(N−1)($M_N$−1). The readiness circuits 308(0)-308(N−1) are also coupled to respective K wake-up signals 312(0)(0)-312(0)(K−1)-312(N−1)(0)-312(N−1)(K−1) that are generated by K issue lane circuits 314(0)-314(K−1) in the respective issue lanes $L_0$-$L_{K-1}$. Each issue lane circuit 314(0)-314(K−1) associated with a respective issue lane $L_0$-$L_{K-1}$ is configured to generate a respective wake-up signal 312(0)(0)-312(0)(K−1) on a wake-up signal port 315 in response to a producer instruction being issued by the clustered scheduler circuit 300 in the respective issue lane $L_0$-$L_{K-1}$. In this example, with the latency-based reservation circuit 302(0) being designated for single-cycle latency consumer instructions, the pick circuit 306(0) in the latency-based reservation circuit 302(0) is coupled to single clock-cycle latency wake-up signals 312(0)(0)-312(0)(K−1), which are not clock cycle delayed. This is important so that the pick circuit 306(0) has the ability to issue a consumer instruction in a back-to-back clock cycle with data from the producer instruction being made available after full execution in clock cycle 4.

In this example, with the latency-based reservation circuit 302(N−1) being designated for three (3) cycle latency consumer instructions, the pick circuit 306(N−1) in the latency-based reservation circuit 302(N−1) is coupled to a wake-up signal 312(N−1)(0)-312(N−1)(K−1) from a wake-up latch circuit 313(N−1) that is delayed by two (2) clock cycles so as to avoid each pick circuit 306(0)-306(N−1) being a load on the wake-up signals 312(N−1)(0)-312(N−1)(K−1) generated from the issue lane circuits 314(0)-314(K−1), which could otherwise increase scheduling latency. In this example, N wake-up latch circuits 313(0)-313(N−1) are provided that are daisy-chained together. The wake-up latch circuits 313(0)-313(N−1) may be latches or flip-flops, as examples. Wake-up latch circuit 313(0) latches wake-up signals 312(N−1)(0)-312(N−1)(K−1) in the same clock cycle as when issued by the issue lane circuits 314(0)-314(K−1). Wake-up latch circuit 313(N−2) latches a clock cycle delayed version of wake-up signals 312(0)(0)-312(0)(K−1) as clock cycle-delayed wake-up signals 312(N−2)(0)-312(N−2)(K−1). Wake-up latch circuit 313(N−1) latches a further clock cycle-delayed version of wake-up signals 312(N−2)(0)-312(N−2)(K−1) as clock-cycle delayed wake-up signals 312(N−1)(0)-312(N−1)(K−1).

As discussed above and described below with regard to FIG. 3B-2, the pick circuit 306(N−1) of the latency-based reservation circuit 302(N−1) receiving the clock cycle-delayed wake-up signals 312(N−1)(0)-312(N−1)(K−1) does not affect performance, because the producer instructions assigned as being stored and clustered in the latency-based reservation circuit 302(N−1) have a cycle latency such that scheduling issuance based on clock cycle-delayed wake-up signals 312(N−1)(0)-312(N−1)(K−1) does not delay providing data from execution of the multiple-cycle latency producer instruction to its consumer instruction. As an example, the clock cycle delay of the clock cycle-delayed wake-up signals 312(N−1)(0)-312(N−1)(K−1) may be the same clock cycle delay as the cycle latency assigned to the latency-based reservation circuit 302(N−1). As another example, the clock cycle delay of the clock cycle-delayed wake-up signals 312(N−1)(0)-312(N−1)(K−1) may be a shorter clock cycle delay than the cycle latency assigned to the latency-based reservation circuit 302(N−1). This would result in the pick circuit 306(N−1) for the latency-based reservation circuit 302(N−1) receiving wake-up signals 312(N−1)(0)-312(N−1)(K−1) earlier than needed so as to not affect performance. As another example, the clock cycle delay of the clock cycle-delayed wake-up signals 312(N−1)(0)-312(N−1)(K−1) may be a greater clock cycle delay than the cycle latency assigned to the latency-based reservation circuit 302(N−1). This would result in the pick circuit 306(N−1) for the latency-based reservation circuit 302(N−1) receiving wake-up signals 312(N−1)(0)-312(N−1)(K−1) later than needed, which could affect performance.

To further illustrate the issuance of instructions in the clustered scheduler circuit 300 in FIG. 3A, timing diagrams in FIGS. 3B-1 and 3B-2 are provided. FIG. 3B-1 is a timing diagram 324 illustrating an exemplary clock-cycle timing of reservation, issuance, and execution of a single-clock cycle latency producer instruction and consumer instruction issued by the clustered scheduler circuit 300 in FIG. 3A. FIG. 3B-2 is a timing diagram 326 illustrating an exemplary clock-cycle timing of reservation, issuance, and execution of a three-clock cycle latency producer instruction and consumer instruction issued from the latency-based reservation circuit 302(N−1) in the clustered scheduler circuit 300 in FIG. 3A having an assigned latency of three (3) clock cycles.

With reference to FIG. 3B-1, the timing diagram 324 is shown in the form of a table that includes clock cycles 1, 2, 3, 4, and 5 along the X-axis and the pipeline stages in an instruction processing circuit in the Y-axis. The pipeline stages shown are RSV for a reservation stage of the latency-based reservation circuit 302(0) in the clustered scheduler circuit 300, ISSUE for an issue stage shown in the issue lanes $L_0$-$L_{K-1}$ in FIG. 3A, and execution stages $A_0$-$A_2$ illustrating up to three (3) execution stages in the execution circuit 305 that are executed over three (3) clock cycles. As previously discussed, some producer instructions are single clock cycle latency instructions in that their produced data is generated by the execution circuit, such as execution circuit 305 in one execution stage and thus one (1) clock cycle. Other producer instructions are multiple clock cycle latency instructions in that their produced data is generated by the execution circuit, such as execution circuit 305, in more than one execution stage and thus more than (1) clock cycle.

As shown in FIG. 3B-1, the timing diagram 324 includes a 'P' in clock cycle 1 ISSUE stage signifying a producer instruction in an issue lane $L_0$-$L_{K-1}$ in FIG. 3A that was previously issued by the pick circuit 306(0). Latency=1 means that the producer instruction is a one (1) clock cycle latency instruction. A consumer instruction signified by 'C' of the producer instruction P is also in clock cycle 1 indicating that a consumer instruction C is stored in a reservation entry 304(0)(0)-304(0)($M_0$-1) in the reservation circuit 302(0) in FIG. 3A. In response to the producer instruction P being in an issue lane $L_0$-$L_{K-1}$ in clock cycle 1, a non-clock cycle delayed wake-up signal signified by wake-up signal 312(0)( ) is generated and communicated to the pick circuit 306(0) in the latency-based reservation circuit 302(0) assigned for single clock cycle latency producer instructions in the clustered scheduler circuit 300 identify the producer instruction P having an issue state indicating issued. As shown in the timing diagram 324 in clock cycle 2, the producer instruction P is shifted to a first execution stage $A_0$ in the execution circuit 305 in FIG. 3A. The consumer instruction C is issued to an issue lane $L_0$-$L_{K-1}$ by the pick circuit 306(0) in FIG. 3A in back-to-back clock cycles with the producer instruction P. The ability to issue consumer instructions dependent on single clock cycle latency producer instructions in back-to-back clock cycles is highly efficient. Because the producer instruction P in this example is a single clock cycle latency producer instruction, the data generated by execution of the producer instruction P is available to the consumer instruction C in clock cycle 2. Thus, the consumer instruction C can consume the data in its execution that was generated by execution of producer instruction P in clock cycle 3.

The timing diagram 326 in FIG. 3B-2 also includes a producer instruction P in clock cycle 1 in an ISSUE stage in an issue lane $L_0$-$L_{K-1}$ in FIG. 3A that was previously issued by the pick circuit 306(N-1). Latency=3 means that the producer instruction P in FIG. 3B is a three (3) clock cycle latency instruction, meaning that the producer instruction P will not be fully executed until the third execution stage $A_2$ in the execution circuit 305 in FIG. 3A. A consumer instruction C of the producer instruction P is also in clock cycle 1 indicating that the consumer instruction C is stored in a reservation entry 304(N-1)(0)-304(N-1)($M_N$-1) in the latency-based reservation circuit 302(N-1) in the clustered scheduler circuit 300 in FIG. 3A. In response to the producer instruction P being in an issue lane $L_0$-$L_{K-1}$ in clock cycle 1, the clock cycle delayed wake-up signal 312(N-1)( ) is not generated like generated in FIG. 3B-2 and not communicated to the pick circuit 306(N-1) in the latency-based reservation circuit 302(N-1) in the clustered scheduler circuit 300 to identify the producer instruction P having an issue state indicating issued. As shown in the timing diagram 326 in FIG. 3B-2 in clock cycle 2, the producer instruction P is shifted to a first execution stage $A_0$ in the execution circuit 305 in FIG. 3A. The consumer instruction C is not issued to an issue lane $L_0$-$L_{K-1}$ by the pick circuit 306(N-1) in the latency-based reservation circuit 302(N-1) in FIG. 3A, because the producer instruction P has not been fully executed. The clock cycle delayed wake-up signal 312(N-1)( ) is generated and communicated to the pick circuit 306(N-1) in the latency-based reservation circuit 302(N-1) in the clustered scheduler circuit 300 in clock cycle 3 to identify the producer instruction P having an issue state indicating issued. Because the producer instruction P in this example is a three (3) clock cycle latency producer instruction, the data generated by execution of the producer instruction P will only be available to the consumer instruction C in clock cycle 4. Thus, the consumer instruction C can consume the data in its execution that was generated by the execution of producer instruction P in clock cycle 5. Thus, as shown in FIG. 3B-2, the clock cycle delayed wake-up signal 312(N-1)( ) being generated in clock cycle 3 and issuance of consumer instruction with execution of producer instruction in clock cycle 4 occur in back-to-back clock cycles.

With reference back to the clustered scheduler circuit 300 in FIG. 3A, the wake-up signals 312(0)(0)-312(0)(K-1)-312(N-1)(0)-312(N-1)(K-1) indicate an issue state as either issue ready or issue not ready. When a producer instruction is issued in an issue lane $L_0$-$L_{K-1}$ by the clustered scheduler circuit 300, this means that it will be executed by the execution circuit 305 and its produced data resulting from execution available to be consumed by any consumer instruction of the producer instruction. The readiness circuits 308(0)-308(N-1) in the respective pick circuits 306(0)-306(N-1) are configured to compare respective wake-up signals 312(0)(0)-312(0)(K-1)-312(N-1)(0)-312(N-1)(K-1) having an issue state indicating issue ready for issued producer instructions up to M instructions in the respective reservation entries 304(0)(0)-304(0)($M_0$-1)-304(N-1)(0)-304(N-1)($M_N$-1) to determine if any such instructions are ready to be executed. For example, if an instruction reservation entry 304(0)(0)-304(0)($M_0$-1)-304(N-1)(0)-304(N-1)($M_N$-1) is a consumer of the issued producer instruction in the respective latency-based reservation circuit 302(0)-302(N-1), the issuance of its producer instructions indicated by a respective wake-up signal 312(0)(0)-312(0)(K-1)-312(N-1)(0)-312(N-1)(K-1) indicates that the data from the producer instruction will become available, and thus the consumer instruction can be issued if no other source operands are unavailable. The readiness circuits 308(0)-308(N-1) are configured to generate respective $M_0$-$M_N$ instruction ready signals 316(0)(0)-316($M_0$-1)-316(0)(0)-316($M_0$-1) indicating if an instruction in a respective reservation entry 304(0)(0)-304(0)($M_0$-1)-304(N-1)(0)-304(N-1)($M_N$-1) is ready to e issued based on the comparison of the respective received wake-up signals 312(0)(0)-312(0)(K-1)-312(N-1)(0)-312(N-1)(K-1) for issued producer instructions to respective $M_0$-$M_N$ instructions in the respective reservation entries 304(0)(0)-304(0)($M_0$-1)-304(N-1)(0)-304(N-1)($M_N$-1). For example, the readiness circuits 308(0)-308(N-1) may be comparator circuits that are configured to compare the respective received wake-up signals 312(0)(0)-312(0)(K-1)-312(N-1)(0)-312(N-1)(K-1) for issued producer instructions to respective $M_0$-$M_N$ instructions in the respective reservation entries 304(0)(0)-304(0)($M_0$-1)-304(N-1)(0)-304(N-1)($M_N$-1). As another example, the readiness circuits 308(0)-308(N-1) may be matrix circuits that are configured to compare the respective received wake-up signals $312(0)(0)$-$312(0)(K-1)$-$312(N-1)(0)$-$312(N-1)(K-1)$ for issued producer instructions to respective $M_0$-$M_N$ instructions in the respective reservation entries $304(0)(0)$-$304(0)(M_0-1)$-$304(N-1)(0)$-$304(N-1)(M_N-1)$.

With continuing reference to FIG. 3A, the pick circuits $306(0)$-$306(N-1)$ in the respective latency-based reservation circuits $302(0)$-$302(N-1)$ include respective K pick circuits $318(0)(0)$-$318(0)(K-1)$-$318(N-1)(0)$-$318(N-1)(K-1)$ that are configured to receive the respective $M_0$-$M_N$ instruction ready signals $316(0)(0)$-$316(0)(M_0-1)$-$316(N-1)(0)$-$316(N-1)(M_N-1)$ from the respective readiness circuits $308(0)$-$308(N-1)$ and generate respective K issue lane pick signals $320(0)(0)$-$320(0)(K-1)$-$320(N-1)(0)$-$320(N-1)(K-1)$ to identify respective instructions in the reservation entries $304(0)(0)$-$304(0)(M_0-1)$-$304(N-1)(0)$-$304(N-1)(M_N-1)$ that are ready to be issued, indicated by an issue state being issue ready. Providing the $M_0$-$M_N$ instruction ready signals $316(0)(0)$-$316(0)(M_0-1)$-$316(N-1)(0)$-$316(N-1)(M_N-1)$ to K respective K issue lane pick signals $320(0)(0)$-$320(0)(K-1)$-$320(N-1)(0)$-$320(N-1)(K-1)$ will involve multiplexing of signals in each latency-based reservation circuit $302(0)$-$302(N-1)$ if K is not equal to M. The issue lane pick signals $320(0)(0)$-$320(0)(K-1)$-$320(N-1)(0)$-$320(N-1)(K-1)$ are provided to K issue selection circuits $322(0)(0)$-$322(0)(K-1)$-$322(N-1)(0)$-$322(N-1)(K-1)$ in the respective reservation circuits $302(0)$-$302(N)$. The issue selection circuits $322(0)(0)$-$322(0)(K-1)$-$322(N-1)(0)$-$322(N-1)(K-1)$ are each coupled to the respective reservation entries $304(0)(0)$-$304(0)(M_0-1)$-$304(N-1)(0)$-$304(N-1)(M_N-1)$ such the $M_0$-$M_N$ entries in the respective reservation entries $304(0)(0)$-$304(0)(M_0-1)$-$304(N-1)(0)$-$304(N-1)(M_N-1)$ are multiplexed into respective K issue selection circuits $322(0)(0)$-$322(0)(K-1)$-$322(N-1)(0)$-$322(N-1)(K-1)$ if K is not equal to M. The issue selection circuits $322(0)(0)$-$322(0)(K-1)$-$322(N-1)(0)$-$322(N-1)(K-1)$ are configured to select an instruction from a respective reservation entry $304(0)(0)$-$304(0)(M_0-1)$-$304(N-1)(0)$-$304(N-1)(M_N-1)$ in response to the instruction identified in the respective issue lane pick signals $320(0)(0)$-$320(0)(K-1)$-$320(N-1)(0)$-$320(N-1)(K-1)$ ready to be issued having an issue state of issue ready. The issue selection circuits $322(0)(0)$-$322(0)(K-1)$-$322(N-1)(0)$-$322(N-1)(K-1)$ are each configured to provide the identified instruction signals $330(0)(0)$-$330(0)(K-1)$-$330(N-1)(0)$-$330(N-1)(K-1)$ to be issued from the received respective issue lane pick signals $320(0)(0)$-$322(0)(K-1)$-$320(N-1)(0)$-$322(N-1)(K-1)$ to respective K issue arbitration circuits $328(0)$-$328(K-1)$ coupled to a respective associated issue lane $L_0$-$L_{K-1}$. The issue arbitration circuits $328(0)$-$328(K-1)$ are each configured to pass an instruction among the instructions selected from the respective issue selection circuits $322(0)(0)$-$322(0)(K-1)$-$322(N-1)(0)$-$322(N-1)(K-1)$ to the respective associated issue lane $L_0$-$L_{K-1}$. The issue arbitration circuits $328(0)$-$328(K-1)$ are configured to decide between which of the latency-based reservation circuits' $302(0)$-$302(N-1)$ instructions selected by the respective issue selection circuits $322(0)(0)$-$322(0)(K-1)$-$322(N-1)(0)$-$322(N-1)(K-1)$ for the issue lane $L_0$-$L_{K-1}$ will actually be issued onto the respective issue lane $L_0$-$L_{K-1}$ in the current clock cycle.

The issue arbitration circuits $328(0)$-$328(K-1)$ in the clustered scheduler circuit 300 in FIG. 3A can be configured to decide between which competing latency-based reservation circuits' $302(0)$-$302(N-1)$ instructions selected by the respective issue selection circuits $322(0)(0)$-$322(0)(K-1)$-$322(N-1)(0)$-$322(N-1)(K-1)$ for the issue lane $L_0$-$L_{K-1}$ will actually be issued onto the respective issue lane $L_0$-$L_{K-1}$ in the current clock cycle based on an allocation policy. For example, issue arbitration circuits $328(0)$-$328(K-1)$ may be configured with an issue arbitration policy to pass the selected instructions from the respective issue selection circuits $322(0)(0)$-$322(0)(K-1)$-$322(N-1)(0)$-$322(N-1)(K-1)$ to an associated respective issue lane $L_0$-$L_{K-1}$ that are from the lowest latency latency-based reservation circuit $302(0)$-$302(N-1)$ if more than one latency-based reservation circuit $302(0)$-$302(N-1)$ is competing for issuance of an instruction to an issue lane $L_0$-$L_{K-1}$. Alternatively, the issue arbitration circuits $328(0)$-$328(K-1)$ may be configured with an issue arbitration policy to pass the selected instructions from the respective issue selection circuits $322(0)(0)$-$322(0)(K-1)$-$322(N-1)(0)$-$322(N-1)(K-1)$ to an associated respective issue lane $L_0$-$L_{K-1}$ that are from the highest latency latency-based reservation circuit $302(0)$-$302(N-1)$. As yet another alternative, the issue arbitration circuits $328(0)$-$328(K-1)$ may be configured with an issue arbitration policy to pass the selected instructions from the respective issue selection circuits $322(0)(0)$-$322(0)(K-1)$-$322(N-1)(0)$-$322(N-1)(K-1)$ to an associated respective issue lane $L_0$-$L_{K-1}$ based on a heuristic determination between the latency-based reservation circuit $302(0)$-$302(N-1)$. For example, this heuristic determination may be based on available capacities of the latency-based reservation circuit $302(0)$-$302(N-1)$, frequency of conflict between latency-based reservation circuit $302(0)$-$302(N-1)$, a random selection between competing latency-based reservation circuit $302(0)$-$302(N-1)$, and a switching back and forth between competing latency-based reservation circuit $302(0)$-$302(N-1)$, as non-limiting examples.

Also, with reference to the clustered scheduler circuit 300 in FIG. 3A, the clustered scheduler circuit 300 may also be configured to implement allocation policies on how received consumer instructions are allocated between the latency-based reservation circuit $302(0)$-$302(N-1)$. For example, the clustered scheduler circuit 300 may be configured to determine if a reservation entry $304(0)(0)$-$304(0)(M_0-1)$-$304(N-1)(0)$-$304(N-1)(M_N-1)$ in a respective latency-based reservation circuit $302(0)$-$302(N-1)$ that is assigned a cycle latency of the cycle latency of the consumer instruction is available. If a reservation entry $304(0)(0)$-$304(0)(M_0-1)$-$304(N-1)(0)$-$304(N-1)(M_N-1)$ in a respective latency-based reservation circuit $302(0)$-$302(N-1)$ that is assigned a cycle latency of the cycle latency of the consumer instruction is available, the clustered scheduler circuit 300 can assign and cause the consumer instruction to be stored in a reservation entry $304(0)(0)$-$304(0)(M_0-1)$-$304(N-1)(0)$-$304(N-1)(M_N-1)$ in a respective latency-based reservation circuit $302(0)$-$302(N-1)$ that has an assigned a cycle latency of the cycle latency of the consumer instruction as the preferred latency-based reservation circuit $302(0)$-$302(N-1)$. If a reservation entry $304(0)(0)$-$304(0)(M_0-1)$-$304(N-1)(0)$-$304(N-1)(M_N-1)$ in a respective latency-based reservation circuit $302(0)$-$302(N-1)$ that is assigned a cycle latency of the cycle latency of the consumer instruction is not available, the clustered scheduler circuit 300 can assign and cause the consumer instruction to be stored in a reservation entry $304(0)(0)$-$304(0)(M_0-1)$-$304(N-1)(0)$-$304(N-1)(M_N-1)$ in a respective latency-based reservation circuit $302(0)$-$302(N-1)$ that is assigned the next highest cycle latency from the cycle latency of the consumer instruction as the as the preferred latency-based reservation circuit $302(0)$-$302(N-1)$. Alternatively, if a reservation entry $304(0)(0)$-$304(0)(M_0-1)$-$304(N-1)(0)$-$304(N-1)(M_N-1)$ in a respective latency-based reservation circuit $302(0)$-$302(N-1)$ that is assigned a cycle latency of the cycle latency of the consumer instruction is not available, the clustered scheduler circuit 300 can assign and cause the consumer instruction to be stored in a reservation entry 304(0)(0)-304(0)($M_0$-1)-304(N-1)(0)-304(N-1)($M_N$-1) in a respective latency-based reservation circuit 302(0)-302(N-1) that that has the best average availability as the preferred latency-based reservation circuit 302(0)-302(N-1).

FIGS. 4A and 4B are a flowchart illustrating an exemplary process 400 of a clustered scheduler circuit, such as the clustered scheduler circuit 300 in FIG. 3A, assigning received producer instructions to a latency-based reservation circuit based on the cycle-latency of the producer instruction, and scheduling issuance of instructions in the latency-based reservation circuits to issue lanes to be executed in an execution circuit. The process 400 in FIG. 4A will be discussed in conjunction with the clustered scheduler circuit 300 in FIG. 3A as an example. A first step in the process 400 involves the clustered scheduler circuit 300 receiving first instructions among the plurality of instructions comprising producer instructions comprised of single clock cycle latency producer instructions and first consumer instructions of the single clock cycle latency producer instructions (block 402 in FIG. 4A). The process 400 also includes the clustered scheduler circuit 300 storing the first instructions in a first reservation entry 304(0)(0)-304(0)($M_0$-1) among first reservation entries (304(0)(0)-304(0)($M_0$-1) in the latency-based reservation circuit 302(0) (block 404 in FIG. 4A). The process 400 also includes the latency-based reservation circuit 302(0) of the clustered scheduler circuit 300 receiving single clock cycle latency wake-up signals 312(0)(K-1)-312(0)(K-1) each associated with an issue lane $L_0$-$L_{K-1}$ among the plurality of issue lanes ($L_0$-$L_{K-1}$), the plurality of single clock cycle latency wake-up signals 312(0)(K-1)-312(0)(K-1) each indicating an issue state of a single clock cycle latency producer instruction in an issue lane $L_0$-$L_{K-1}$ among the plurality of issue lanes $L_0$-$L_{K-1}$ (block 406 in FIG. 4A). The process 400 also includes the latency-based reservation circuit 302(0) of the clustered scheduler circuit 300 determining if the first instructions are ready to be scheduled for execution, in response to the plurality of single clock cycle latency wake-up signals 312(0)(K-1)-312(0)(K-1) associated with a single clock cycle latency producer instruction of the first instructions having an issue state of issue ready (block 408 in FIG. 4A). The process 400 also includes the latency-based reservation circuit 302(0) of the clustered scheduler circuit 300 identifying the plurality of first instructions having the issue state of issue ready (block 410 in FIG. 4A). The process 400 also includes the latency-based reservation circuit 302(0) of the clustered scheduler circuit 300 selecting the first instructions stored among the plurality of first reservation entries 304(0)(0)-304(0)($M_0$-1) identified as having an issue state of issue ready (block 412 in FIG. 4A).

With continuing reference to FIG. 4A, the process 400 also includes the clustered scheduler circuit 300 receiving second instructions among the plurality of instructions comprising second clock cycle latency producer instructions having the same second clock cycle latency of at least two (2) clock cycles and second consumer instructions of the second clock cycle latency producer instructions (block 414 in FIG. 4A). The process 400 also includes the clustered scheduler circuit 300 storing the second consumer instructions in second reservation entries 304(N-1)(0)-304(N-1)($M_N$-1) among a plurality of second reservation entries 304(N-1)(0)-304(N-1)($M_N$-1) (block 416 in FIG. 4A). The process 400 also includes the latency-based reservation circuit 302(N-1) in the clustered scheduler circuit 300 receiving second clock cycle latency wake-up signals 312(N-1)(K-1)-312(N-1)(K-1) each associated with an issue lane $L_0$-$L_{K-1}$, the second clock cycle latency wake-up signals 312(N-1)(K-1)-312(N-1)(K-1) each indicating an issue state of a second clock cycle latency producer instruction in an issue lane $L_0$-$L_{K-1}$ (block 418 in FIG. 4B). The process 400 also includes the latency-based reservation circuit 302(N-1) in the clustered scheduler circuit 300 determining if the second consumer instructions are ready to be scheduled for execution, in response to the second clock cycle latency wake-up signals 312(N-1)(K-1)-312(N-1)(K-1) associated with a second clock cycle latency producer instruction of the plurality of second consumer instructions having an issue state of issue ready (block 420 in FIG. 4B). The process 400 also includes the latency-based reservation circuit 302(N-1) in the clustered scheduler circuit 300 identifying the second consumer instructions having the issue state of issue ready (block 422 in FIG. 4B). The process 400 also includes the latency-based reservation circuit 302(N-1) in the clustered scheduler circuit 300 selecting second consumer instructions stored among second reservation entries 304(N-1)(0)-304(N-1)($M_N$-1) identified as having an issue state of issue ready (block 424 in FIG. 4B).

With continuing reference to FIG. 4B, the process 400 also includes the clustered scheduler circuit 300 passing a consumer instruction among the selected first consumer instructions and the selected second instructions to its associated issue lane $L_0$-$L_{K-1}$ (block 426 in FIG. 4B). The process 400 also includes the clustered scheduler circuit 300 generating a single clock cycle latency wake-up signal 312(0)(0)-312(0)(K-1) having an issue state of issue ready, in response to a single clock cycle latency producer instruction issued (block 426 in FIG. 4B).

FIG. 4C is a flowchart illustrating additional exemplary processes of process 400 in FIGS. 4A and 4B of a clustered scheduler circuit, such as clustered scheduler circuit 300 handling assignment of consumer instructions to latency-based reservation circuits based on the cycle-latency of its producer instruction and based on availability of the to latency-based reservation circuits. The processes 400 in FIG. 4C will be discussed in conjunction with the clustered scheduler circuit 300 in FIG. 3A as an example. The additional process in FIG. 4C can be related to the blocks 402 and/or 414 in FIG. 4A.

The process 400 includes determining if a first reservation entry 304(0)(0)-304(0)($M_0$-1) in the first latency-based reservation circuit 304(0) is available for a received single clock cycle latency consumer instruction (block 430 in FIG. 4C). If so, the process 400 also includes receiving the instruction in block 402 in FIG. 4A as the single clock-cycle latency consumer instruction (block 432 in FIG. 4C). If a first reservation entry 304(0)(0)-304(0)($M_0$-1) in the first latency-based reservation circuit 302(0) is not available, as discussed above, several exemplary options are available. In one example, as discussed previously, the second latency-based reservation circuit 302(N-1) having a higher latency than the first latency-based reservation circuit 302(0) receives the instructions further comprising the single clock-cycle latency consumer instruction (block 434 in FIG. 4C) as block 414 in FIG. 4A. In another example, as discussed previously, the second latency-based reservation circuit 302(N-1) having the next highest latency than the first latency-based reservation circuit 302(0) receives the instruction comprising the single clock-cycle latency consumer instruction (block 436 in FIG. 4C) as block 414 in FIG. 4A. In another example, as discussed previously, if first reservation entry 304(0)(0)-304(0)($M_0$-1) in the first latency-based reservation circuit 302(0) is not available (block 430 in FIG. 4C), the latency-based reservation circuit 302(1)-302(N–1) with the best average availability among the other latency-based reservation circuits 302(1)-302(N–1) is determined (block 438 in FIG. 4C). Then, in response to a third latency-based reservation circuits 302(1)-302(N–1) having the best average availability among the other latency-based reservation circuits 302(1)-302(N–1), the third latency-based reservation circuits 302(1)-302(N–1) receives the consumer instruction comprising the single clock-cycle latency consumer instruction (block 440 in FIG. 4C).

With reference to the clustered scheduler circuit 300 in FIG. 3A, it is also possible to latch and delay the selected instruction signals 330(N–1)(0)-330(N–1)(K–1) from the latency-based reservation circuit 302(N–1) based on the assigned cycle latency of the latency-based reservation circuit 302(N–1) to isolate the selected instruction signals 330(N–1)(0)-330(N–1)(K–1) from the issue arbitration circuits 328(0)-328(K–1) to reduce the load on the latency-based reservation circuit 302(N–1) so as to reduce or not increase its schedule latency. For example, delaying providing the selected instruction signals 330(N–1)(0)-330(N–1)(K–1) to the issue arbitration circuits 328(0)-328(K–1) may not negatively affect performance of the latency-based reservation circuit 302(N–1), because the data from execution of its producer instruction will be delayed as having a multiple clock-cycle latency.

In this regard, FIG. 5A is a diagram of an exemplary latency-based instruction reservation clustered scheduler circuit 500 ("clustered scheduler circuit" 500) that includes a plurality (N number) of the latency-based reservation circuits 302(0)-302(N–1) like in the clustered scheduler circuit 300 in FIG. 3A. The clustered scheduler circuit 500 can be employed as the scheduler circuit 106 in the instruction processing circuit 104 in FIG. 1. Common elements between the clustered scheduler circuit 500 in FIG. 5A and the clustered scheduler circuit 300 in FIG. 3A are shown with common element numbers in FIG. 5A and will not be re-described. In this example, unlike the clustered scheduler circuit 300 in FIG. 3A, each of the latency-based reservation circuits 302(0)-302(N–1) are coupled to the same wake-up signals 312(0)-312(K–1) that are not clock cycle delayed similar to the scheduler circuit 200 in FIG. 2A. However, in this example, the issue lane pick signals 320(N–1)(0)-320(N–1)(K–1) are latched and clock cycle delayed. N lane pick latch circuits 502(N–2)-502(N–1) are provided that are daisy-chained together. The lane pick latch circuits 502(N–2)-502(N–1) may be latches or flip-flops, as examples. Lane pick latch circuit 502(N–1) latches issue lane pick signals 320(N–1)(0)-(N–1)(K–1) in the same clock cycle as when issued by the issue selection circuit 322(N–1)(0)-322(N–1)(M$_N$–1). Lane pick latch circuit 502(N–1) latches a clock cycle delayed version of issue lane pick signals 320(N–1)(0)-320(N–1)(K–1) as clock cycle-delayed issue lane pick signals 320(N–1)(0)-320(N–1)(K–1).

As discussed above and described below with regard to FIG. 5A, the pick circuit 306(N–1) of the latency-based reservation circuit 302(N–1) generating the clock cycle-delayed issue lane pick signals 320(N–1)(0)-320(N–1)(K–1) does not affect performance, because the data from execution of a producer instruction corresponding to a consumer instruction requested to be issued as identified by the clock cycle-delayed issue lane pick signals 320(N–1)(0)-320(N–1)(K–1) will be delayed as having a multiple clock-cycle latency. As an example, the clock cycle delay of the clock cycle-delayed issue lane pick signals 320(N–1)(0)-320(N–1)(K–1) may be the same clock cycle delay as the cycle latency assigned to the latency-based reservation circuit 302(N–1). As another example, the clock cycle delay of the issue lane pick signals 320(N–1)(0)-320(N–1)(K–1) may be less clock cycle delay as the cycle latency assigned to the latency-based reservation circuit 302(N–1). This would result in the pick circuit 306(N–1) for the latency-based reservation circuit 302(N–1) generating issue lane pick signals 320(N–1)(0)-320(N–1)(K–1) earlier than needed so as to not affect performance. As another example, the clock cycle delay of the of the clock cycle-delayed issue lane pick signals 320(N–1)(0)-320(N–1)(K–1) may be greater clock cycle delay as the cycle latency assigned to the latency-based reservation circuit 302(N–1). This would result in the pick circuit 306(N–1) for the latency-based reservation circuit 302(N–1) generating the clock cycle-delayed issue lane pick signals 320(N–1)(0)-(N–1)(K–1) later than needed, which could affect performance.

To further illustrate the issuance of instructions in the clustered scheduler circuit 500 in FIG. 5A, timing diagrams in FIGS. 5B-1 and 5B-2 are provided. FIG. 5B-1 is a timing diagram 524 illustrating an exemplary clock-cycle timing of reservation, issuance, and execution of a single-clock cycle latency producer instruction and consumer instruction issued by the clustered scheduler circuit 500 in FIG. 5A. FIG. 5B-2 is a timing diagram 526 illustrating an exemplary clock-cycle timing of reservation, issuance, and execution of a three-clock cycle latency producer instruction and consumer instruction issued from the latency-based reservation circuit 302(N–1) in the clustered scheduler circuit 300 in FIG. 5A having an assigned latency of three (3) clock cycles.

With reference to FIG. 5B-1, the timing diagram 524 is shown in the form of a table that includes clock cycles 1, 2, 3, 4, and 5 along the X-axis and the pipeline stages in an instruction processing circuit in the Y-axis. The pipeline stages shown are RSV for a reservation stage of the latency-based reservation circuit 302(0) in the clustered scheduler circuit 500, ISSUE for an issue stage shown in the issue lanes $L_0$-$L_{K-1}$ in FIG. 5A, and execution stages $A_0$-$A_2$ illustrating up to three (3) execution stages in the execution circuit 305 that are executed over three (3) clock cycles. As previously discussed, some producer instructions are single clock cycle latency instructions in that their produced data is generated by the execution circuit, such as execution circuit 305 in one execution stage and thus one (1) clock cycle. Other producer instructions are multiple clock cycle latency instructions in that their produced data is generated by the execution circuit, such as execution circuit 305, in more than one execution stage and thus more than (1) clock cycle.

As shown in FIG. 5B-1, the timing diagram 524 includes a 'P' in clock cycle 1 ISSUE stage signifying a producer instruction in an issue lane $L_0$-$L_{K-1}$ in FIG. 5A that was previously issued by the pick circuit 306(0). Latency=1 means that the producer instruction is a one (1) clock cycle latency instruction. A consumer instruction signified by 'C' of the producer instruction P is also in clock cycle 1 indicating that a consumer instruction C is stored in a reservation entry 304(0)(0)-304(0)(M$_0$–1) in the reservation circuit 302(0) in FIG. 5A. In response to the producer instruction P being in an issue lane $L_0$-$L_{K-1}$ in clock cycle 1, a non-clock cycle delayed wake-up signal signified by wake-up signal 312 is generated and communicated to the pick circuit 306(0) in the latency-based reservation circuit 302(0) assigned single clock cycle latency producer instructions in the clustered scheduler circuit 500 to identify the producer instruction P having an issue state indicating issued. As shown in the timing diagram 524 in clock cycle 2, the producer instruction P is shifted to a first execution stage $A_0$ in the execution circuit 305 in FIG. 5A. The consumer instruction C is issued to an issue lane $L_0$-$L_{K-1}$ by the pick circuit 306(0) in FIG. 5A in back-to-back clock cycles with the producer instruction P. The ability to issue consumer instructions dependent on single clock cycle latency producer instructions in back-to-back clock cycles is highly efficient. Because the producer instruction P in this example is a single clock cycle latency producer instruction, the data generated by execution of the producer instruction P is available to the consumer instruction C in clock cycle 2. Thus, the consumer instruction C can consume the data in its execution that was generated by execution of producer instruction P in clock cycle 3.

The timing diagram 526 in FIG. 5B-2 also includes a producer instruction P in clock cycle 1 in an ISSUE stage in an issue lane $L_0$-$L_{K-1}$ in FIG. 5A that was previously issued by the pick circuit 306(0). Latency=3 means that the producer instruction P in FIG. 5B is a three (3) clock cycle latency instruction, meaning that the producer instruction P will not be fully executed until the third execution stage $A_2$ in the execution circuit 305 in FIG. 5A. A consumer instruction C of the producer instruction P is also in clock cycle 1 indicating the consumer instruction C is stored in a reservation entry 304(N−1)(0)-304(N−1)($M_N$−1) in the latency-based reservation circuit 302(N−1) in the clustered scheduler circuit 500 in FIG. 5A. In response to the producer instruction P being in an issue lane $L_0$-$L_{K-1}$ in clock cycle 1, the wake-up signal 312 is generated like shown for the scheduler circuit 200 in FIG. 2B-2 and communicated to the pick circuit 306(N−1) in the latency-based reservation circuit 302(N−1) in the clustered scheduler circuit 500 to identify the producer instruction P having an issue state indicating issued. As shown in the timing diagram 526 in FIG. 5B-2 in clock cycle 2, the producer instruction P is shifted to a first execution stage $A_0$ in the execution circuit 305 in FIG. 5A. The consumer instruction C is not issued to an issue lane $L_0$-$L_{K-1}$ by the pick circuit 306(N−1) in the latency-based reservation circuit 302(N−1) in FIG. 3A, because the producer instruction P has not been fully executed. Because the producer instruction P in this example is a three (3) clock cycle latency producer instruction, the data generated by execution of the producer instruction P will only be available to the consumer instruction C in clock cycle 4. Thus, the consumer instruction C can consume the data in its execution that was generated by execution of producer instruction P in clock cycle 5. Thus, as shown in FIG. 5B-2, the clock cycle-delayed issue lane pick signals 320(N−1)(0)-320(N−1)(K−1) being generated in clock cycle 4 to cause the consumer instruction C to be issued by the clustered scheduler circuit 500 does not affect performance to achieve back-to-back issuance of a consumer instruction in a back-to-back clock cycle with data from the producer instruction being made available after full execution in clock cycle 5.

It is also possible to provide a scheduler circuit where a latency-based reservation circuit with an assigned clock cycle latency greater than one (1) clock cycle either receives a latched wake-up signal like the clustered scheduler circuit 300 in FIG. 3A, or generates latched and delayed selected instruction signals from a latency-based reservation circuits having an assigned clock cycle latency greater than one (1) clock cycle like the clustered scheduler circuit 500 in FIG. 5A. In this regard, FIG. 6A is a diagram of an exemplary latency-based instruction reservation clustered scheduler circuit 600 ("clustered scheduler circuit" 600) that includes a plurality (N number) of latency-based reservation circuits 302(0)-302(N−1) like in the scheduler circuits 300, 500 in FIGS. 3A and 5A. The clustered scheduler circuit 600 can be employed as the scheduler circuit 106 in the instruction processing circuit 104 in FIG. 1. Common elements between the clustered scheduler circuit 600 in FIG. 6A and the scheduler circuits 300, 500 in FIGS. 3A and 5A are shown with common element numbers in FIG. 6A and will not be re-described. Note that although FIG. 6A illustrates the wake-up latch circuits 313(0)-313(N−1) that would correspond to each latency-based reservation circuit 302(1)-302(N−1) and also illustrates clock cycle-delayed issue lane pick signals 320(N−1)(0)-320(N−1)(K−1) generated for each latency-based reservation circuit 302(1)-302(N−1), only one of these solutions is provided for each latency-based reservation circuit 302(1)-302(N−1) in this example to avoid unnecessarily delaying both wake-up and picking of consumer instructions.

To further illustrate the issuance of instructions in the clustered scheduler circuit 600 in FIG. 6A, timing diagrams in FIGS. 6B-1 and 6B-2 are provided. FIG. 6B-1 is a timing diagram 624 illustrating an exemplary clock-cycle timing of reservation, issuance, and execution of a single-clock cycle latency producer instruction and consumer instruction issued by the clustered scheduler circuit 600 in FIG. 6A. FIG. 6B-2 is a timing diagram 626 illustrating an exemplary clock-cycle timing of reservation, issuance, and execution of a three-clock cycle latency producer instruction and consumer instruction issued from the latency-based reservation circuit 302(N−1) in the clustered scheduler circuit 300 in FIG. 6A having an assigned latency of three (3) clock cycles.

With reference to FIG. 6B-1, the timing diagram 624 is shown in the form of a table that includes clock cycles 1, 2, 3, 4, and 5 along the X-axis and the pipeline stages in an instruction processing circuit in the Y-axis. The pipeline stages shown are RSV for a reservation stage of the latency-based reservation circuit 302(0) in the clustered scheduler circuit 600, ISSUE for an issue stage shown in the issue lanes $L_0$-$L_{K-1}$ in FIG. 6A, and execution stages $A_0$-$A_2$ illustrating up to three (3) execution stages in the execution circuit 305 that are executed over three (3) clock cycles. As previously discussed, some producer instructions are single clock cycle latency instructions in that their produced data is generated by the execution circuit, such as execution circuit 305 in one execution stage and thus one (1) clock cycle. Other producer instructions are multiple clock cycle latency instructions in that their produced data is generated by the execution circuit, such as execution circuit 305, in more than one execution stage and thus more than (1) clock cycle.

As shown in FIG. 6B-1, the timing diagram 624 includes a 'P' in clock cycle 1 ISSUE stage signifying a producer instruction in an issue lane $L_0$-$L_{K-1}$ in FIG. 6A that was previously issued by the pick circuit 306(0). Latency=1 means that the producer instruction is a one (1) clock cycle latency instruction. A consumer instruction signified by 'C' of the producer instruction P is also in clock cycle 1 indicating that a consumer instruction C is stored in a reservation entry 304(0)(0)-304(0)($M_0$−1) in the reservation circuit 302(0) in FIG. 6A. In response to the producer instruction P being in an issue lane $L_0$-$L_{K-1}$ in clock cycle 1, a non-clock cycle delayed wake-up signal signified by wake-up signal 312(0)( ) is generated and communicated to the pick circuit 306(0) in the latency-based reservation circuit 302(0) assigned single clock cycle latency producer instructions in the clustered scheduler circuit 600 to identify the producer instruction P having an issue state indicating issued. As shown in the timing diagram 624 in clock cycle 2, the producer instruction P is shifted to a first execution stage $A_0$ in the execution circuit 305 in FIG. 6A. The consumer instruction C is issued to an issue lane $L_0$-$L_{K-1}$ by the pick circuit 306(0) in FIG. 6A in back-to-back clock cycles with the producer instruction P. The ability to issue consumer instructions dependent on single clock cycle latency producer instructions in back-to-back clock cycles is highly efficient. Because the producer instruction P in this example is a single clock cycle latency producer instruction, the data generated by execution of the producer instruction P is available to the consumer instruction C in clock cycle 2. Thus, the consumer instruction C can consume the data in its execution that was generated by execution of producer instruction P in clock cycle 3.

The timing diagram 626 in FIG. 6B-2 also includes a producer instruction P in clock cycle 1 in an ISSUE stage in an issue lane $L_0$-$L_{K-1}$ in FIG. 6A that was previously issued by the pick circuit 306(N−1). Latency=3 means that the producer instruction P in FIG. 6B is a three (3) clock cycle latency instruction, meaning that the producer instruction P will not be fully executed until the third execution stage $A_2$ in the execution circuit 305 in FIG. 6A. A consumer instruction C of the producer instruction P is also in clock cycle 1 indicating the consumer instruction C is stored in a reservation entry 304(N−1)(0)-304(N−1)($M_N$−1) in the latency-based reservation circuit 302(N−1) in the clustered scheduler circuit 600 in FIG. 6A. In response to the producer instruction P being in an issue lane $L_0$-$L_{K-1}$ in clock cycle 1, the clock cycle delayed wake-up signal 312(N−1)( ) is not generated like in FIG. 2B-2 and not communicated to the pick circuit 306(N−1) in the latency-based reservation circuit 302(N−1) in the clustered scheduler circuit 300 to identify the producer instruction P having an issue state indicating issued. As shown in the timing diagram 626 in FIG. 6B-2 in clock cycle 2, the producer instruction P is shifted to a first execution stage $A_0$ in the execution circuit 305 in FIG. 6A. The consumer instruction C is not issued to an issue lane $L_0$-$L_{K-1}$ by the pick circuit 306(N−1) in the latency-based reservation circuit 302(N−1) in FIG. 6A, because the producer instruction P has not been fully executed. The clock cycle delayed wake-up signal 312(N−1)( ) is generated and communicated to the pick circuit 306(N−1) in the latency-based reservation circuit 302(N−1) in the clustered scheduler circuit 600 in clock cycle 3 to identify the producer instruction P having an issue state indicating issued. Because the producer instruction P in this example is a three (3) clock cycle latency producer instruction, the data generated by the execution of the producer instruction P will only be available to the consumer instruction C in clock cycle 4. Thus, as also shown in FIG. 6B-2, the clock cycle delayed wake-up signal 312(N−1)( ) being generated in clock cycle 3 and issuance of consumer instruction with execution of producer instruction in clock cycle 4 occur in back-to-back clock cycles. Thus, as also shown in FIG. 6B-2, the clock cycle-delayed issue lane pick signals 320(N−1)(0)-320(N−1)(K−1) being generated in clock cycle 4 to cause the consumer instruction C to be issued by the clustered scheduler circuit 600 does not affect performance to achieve back-to-back issuance of a consumer instruction in a back-to-back clock cycle with data from the producer instruction being made available after full execution in clock cycle 5.

FIG. 7 is a block diagram of an exemplary processor-based system 700 that includes a reach processor 702 (e.g., a microprocessor) that includes an instruction processing circuit 704 that includes a clustered scheduler circuit 706 that includes a plurality of latency-based reservation circuits each configured to cluster the same cycle-latency consumer instructions scheduled for issuance by respective pick circuits to common issue lanes for execution by an execution circuit. For example, the processor 702 in FIG. 11 could be the processor 102 in FIG. 1 that includes the instruction processing circuit 704 including a clustered scheduler circuit 706. The clustered scheduler circuit 706 could be any of the clustered scheduler circuits 300, 500, 600 in FIGS. 3A, 5A, 6A, respectively, as non-limiting examples. The processor-based system 700 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 700 includes the processor 702. The processor 702 represents one or more general-purpose processing circuits, such as a microprocessor, central processing unit, or the like. More particularly, the processor 702 may be an EDGE instruction set microprocessor, or other processor implementing an instruction set that supports explicit consumer naming for communicating produced values resulting from execution of producer instructions. The processor 702 is configured to execute processing logic in instructions for performing the operations and steps discussed herein. In this example, the processor 702 includes an instruction cache 708 for temporary, fast access memory storage of instructions accessible by the instruction processing circuit 704. Fetched or prefetched instructions from a memory, such as from the system memory 710 over a system bus 712, are stored in the instruction cache 708. The instruction processing circuit 704 is configured to process instructions fetched into the instruction cache 708 and process the instructions for execution.

The processor 702 and the system memory 710 are coupled to the system bus 712 and can intercouple peripheral devices included in the processor-based system 700. As is well known, the processor 700 communicates with these other devices by exchanging address, control, and data information over the system bus 712. For example, the processor 702 can communicate bus transaction requests to a memory controller 714 in the system memory 710 as an example of a slave device. Although not illustrated in FIG. 7, multiple system buses 712 could be provided, wherein each system bus constitutes a different fabric. In this example, the memory controller 714 is configured to provide memory access requests to a memory array 716 in the system memory 710. The memory array 716 is comprised of an array of storage bit cells for storing data. The system memory 710 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 712. As illustrated in FIG. 7, these devices can include the system memory 710, one or more input device(s) 718, one or more output device(s) 720, a modem 722, and one or more display controllers 724, as examples. The input device(s) 718 can include any type of input device, including but not limited to input keys, switches, voice processors, etc. The output device(s) 720 can include any type of output device, including but not limited to audio, video, other visual indicators, etc. The modem 722 can be any device configured to allow exchange of data to and from a network 726. The network 726 can be any type of network, including but not limited to a wired or wireless network, a private or public network, a local area network (LAN), a wireless local area network (WLAN), a wide area network (WAN), a BLUETOOTH™ network, and the Internet. The modem 722 can be configured to support any type of communications protocol desired. The processor 702 may also be configured to access the display controller(s) 724 over the system bus 712 to control information sent to one or more displays 728. The display(s) 728 can include any type of display, including but not limited to a cathode ray tube (CRT), a liquid crystal display (LCD), a plasma display, etc.

The processor-based system 700 in FIG. 77 may include a set of instructions 730 to be executed by the processor 702 for any application desired according to the instructions. The instructions 730 may be stored in the system memory 710, processor 702, and/or instruction cache 708 as examples of a non-transitory computer-readable medium 732. The instructions 730 may also reside, completely or at least partially, within the system memory 710 and/or within the processor 702 during their execution. The instructions 730 may further be transmitted or received over the network 726 via the modem 722, such that the network 726 includes the computer-readable medium 732.

While the computer-readable medium 732 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A clustered scheduler circuit in a processor configured to receive a plurality of instructions comprising producer instructions and consumer instructions to be scheduled for execution, the clustered scheduler circuit comprising:
    a first latency-based reservation circuit configured to:
        receive first consumer instructions among the plurality of instructions dependent on the producer instructions having a single clock cycle latency;
        store the first consumer instructions in first reservation entries among a plurality of first reservation entries; and
        select a plurality of first consumer instructions stored among the plurality of first reservation entries identified as having an issue state of issue ready;
    a first pick circuit coupled to the plurality of first reservation entries and a single clock cycle latency wake-up signal port, the first pick circuit configured to:
        receive a plurality of single clock cycle latency wake-up signals on the single clock cycle latency wake-up signal port each associated with an issue lane among a plurality of issue lanes, the plurality of single clock cycle latency wake-up signals each indicating an issue state of a single clock cycle latency producer instruction in an issue lane among the plurality of issue lanes;
        determine if the plurality of first consumer instructions are ready to be scheduled for execution, in response to the plurality of single clock cycle latency wake-up signals associated with a single clock cycle latency producer instruction of the plurality of first consumer instructions having an issue state of issue ready; and
        identify the plurality of first consumer instructions having the issue state of issue ready;
    a second latency-based reservation circuit configured to:
        receive second consumer instructions among the plurality of instructions dependent on the producer instructions having a same second clock cycle latency of at least two (2) clock cycles;
        store the second consumer instructions in second reservation entries among a plurality of second reservation entries; and
        select a plurality of second consumer instructions stored among the plurality of second reservation entries identified as having an issue state of issue ready;
    a second pick circuit coupled to the plurality of second reservation entries and a second clock cycle latency wake-up signal port, the second pick circuit configured to:
        receive a plurality of second clock cycle latency wake-up signals on the second clock cycle latency wake-up signal port each associated with an issue lane among the plurality of issue lanes, the plurality of second clock cycle latency wake-up signals each indicating an issue state of a second clock cycle latency producer instruction in an issue lane among the plurality of issue lanes;
        determine if the plurality of second consumer instructions are ready to be scheduled for execution, in response to the plurality of second clock cycle latency wake-up signals associated with a second clock cycle latency producer instruction of the plurality of second consumer instructions having an issue state of issue ready; and
        identify the plurality of second consumer instructions having the issue state of issue ready;
    a plurality of issue arbitration circuits each coupled to an associated issue lane among the plurality of issue lanes and coupled to the first latency-based reservation circuit and the second latency-based reservation circuit, the plurality of issue arbitration circuits each configured to pass an instruction among the selected plurality of first consumer instructions and the selected plurality of second consumer instructions to its associated issue lane; and
    a plurality of issue lane circuits comprising the plurality of issue lanes, each issue lane circuit among the plurality of issue lane circuits configured to generate a single clock cycle latency wake-up signal among the plurality of single clock cycle latency wake-up signals having an issue state of issue ready on the single clock cycle latency wake-up signal port, in response to a single clock cycle latency producer instruction issued in the issue lane circuit.

2. The clustered scheduler circuit of claim 1, wherein:
    the first latency-based reservation circuit comprises:
        a plurality of first issue selection circuits each associated with a respective issue lane among the plurality of issue lanes and coupled to the plurality of first reservation entries, each first issue selection circuit among the plurality of first issue selection circuits configured to select the plurality of first consumer instructions stored among the plurality of first reservation entries, in response to a first issue lane pick signal among a plurality of first issue lane pick signals designated for the associated issue lane identifying the first reservation entry in an issue state of issue ready;

the first pick circuit comprises:
  a first readiness circuit coupled to the plurality of first reservation entries and to the single clock cycle latency wake-up signal port, the first readiness circuit configured to generate a plurality of first instruction ready signals corresponding to the plurality of first consumer instructions in response to a single clock cycle latency producer instruction for the plurality of first consumer instructions being in an issue lane among the plurality of issue lanes; and
  a plurality of first pick circuits each configured to receive the plurality of first instruction ready signals and generate a plurality of first issue lane pick signals each associated with an issue lane among the plurality of issue lanes in response to the plurality of first consumer instruction ready signals having the issue state of issue ready, to identify the plurality of first consumer instructions having the issue state of issue ready;
the second latency-based reservation circuit comprises:
  a plurality of second issue selection circuits each associated with a respective issue lane among the plurality of issue lanes and coupled to the plurality of second reservation entries, each second issue selection circuit among the plurality of second issue selection circuits configured to select the plurality of second consumer instructions stored among the plurality of second reservation entries, in response to a second issue lane pick signal among a plurality of second issue lane pick signals designated for the associated issue lane identifying the second reservation entry in an issue state of issue ready; and
the second pick circuit comprises:
  a second readiness circuit coupled to the plurality of second reservation entries and to the second clock cycle latency wake-up signal port, the second readiness circuit configured to generate a plurality of second instruction ready signals corresponding to the plurality of second consumer instructions in response to a second clock cycle latency producer instruction for the plurality of second consumer instructions being in an issue lane among the plurality of issue lanes; and
  a plurality of second pick circuits each configured to receive the plurality of second instruction ready signals and generate a plurality of second issue lane pick signals each associated with an issue lane among the plurality of issue lanes in response to the plurality of second consumer instruction ready signals having the issue state of issue ready, to identify the plurality of second consumer instructions having the issue state of issue ready.

3. The clustered scheduler circuit of claim 1, further comprising:
  a third latency-based reservation circuit configured to:
    receive third consumer instructions among the plurality of instructions dependent on the producer instructions having a same third clock cycle latency of at least two (2) clock cycles and a different latency from the second clock cycle latency;
    store the third consumer instructions in third reservation entries among a plurality of third reservation entries; and
    select a plurality of third consumer instructions stored among the plurality of third reservation entries identified as having an issue state of issue ready; and a third pick circuit coupled to the plurality of third reservation entries and a third clock cycle latency wake-up signal port, the third pick circuit configured to:
    receive a plurality of third clock cycle latency wake-up signals on the third clock cycle latency wake-up signal port each associated with an issue lane among the plurality of issue lanes, the plurality of third clock cycle latency wake-up signals each indicating an issue state of a third clock cycle latency producer instruction in an issue lane among the plurality of issue lanes;
    determine if the plurality of third consumer instructions are ready to be scheduled for execution, in response to the plurality of third clock cycle latency wake-up signals associated with a third clock cycle latency producer instruction of the plurality of third consumer instructions having an issue state of issue ready; and
    identify the plurality of third consumer instructions having the issue state of issue ready; and
  a plurality of third issue arbitration circuits each further coupled to the third latency-based reservation circuit, the plurality of third issue arbitration circuits each further configured to pass a third consumer instruction among the selected plurality of third consumer instructions to its associated issue lane.

4. The clustered scheduler circuit of claim 1, further comprising a wake-up signal latch circuit configured to receive clock cycle latency wake-up signals based on the single clock cycle latency wake-up signal and delay the received clock cycle latency wake-up signals based on the single clock cycle latency wake-up signal by at least one clock cycle as the second clock cycle latency wake-up signals.

5. The clustered scheduler circuit of claim 4, wherein the wake-up signal latch circuit is configured to delay the clock cycle latency wake-up signals based on the single clock cycle latency wake-up signal on a latch output by the second clock cycle latency as the second clock cycle latency wake-up signals.

6. The clustered scheduler circuit of claim 2, further comprising an issue selection latch circuit configured to receive the selected plurality of second consumer instructions selected by the plurality of second issue selection circuits and delay the selected plurality of second consumer instructions by at least one clock cycle.

7. The clustered scheduler circuit of claim 6, wherein the issue selection latch circuit is configured to delay the selected plurality of second consumer instructions by the second clock cycle latency.

8. The clustered scheduler circuit of claim 6, wherein the second clock cycle latency wake-up signal port is the same port as the first clock cycle latency wake-up signal port.

9. The clustered scheduler circuit of claim 4, further comprising an issue selection latch circuit configured to receive the selected plurality of second consumer instructions selected by the plurality of second issue selection circuits and delay the selected plurality of second consumer instructions by at least one clock cycle.

10. The clustered scheduler circuit of claim 1 further configured to:
  determine if a first reservation entry in the first latency-based reservation circuit is available for a received single clock cycle latency consumer instruction; and
  in response to a first reservation entry in the first latency-based reservation circuit being available for the received single clock cycle latency consumer instruction, the first latency-based reservation circuit further configured to receive the first instructions further comprising the single clock cycle latency consumer instruction.

11. The clustered scheduler circuit of claim 10, further configured to:
in response to a first reservation entry in the first latency-based reservation circuit not being available for the received single clock cycle latency consumer instruction, the second latency-based reservation circuit having a higher latency than the first latency-based reservation circuit further configured to receive the second instructions further comprising the single clock cycle latency consumer instruction.

12. The clustered scheduler circuit of claim 10, further configured to:
in response to a first reservation entry in the first latency-based reservation circuit not being available for the received single clock cycle latency consumer instruction, the second latency-based reservation circuit having a next highest latency than the first latency-based reservation circuit further configured to receive the second instructions further comprising the single clock cycle latency consumer instruction.

13. The clustered scheduler circuit of claim 3 further configured to:
determine if a first reservation entry in the first latency-based reservation circuit is available for a received single clock cycle latency consumer instruction; and
in response to a first reservation entry in the first latency-based reservation circuit not being available for the received single clock cycle latency consumer instruction, the clustered scheduler circuit further configured to determine the latency-based reservation circuit with a best average availability for instructions among the second latency-based instruction circuit and the third latency-based instruction circuit; and
in response to the third latency-based instruction having the best average availability for instructions, the third latency-based reservation circuit further configured to receive the second consumer instructions further comprising the single clock cycle latency consumer instruction.

14. The clustered scheduler circuit of claim 1, wherein the plurality of issue arbitration circuits are each configured to pass the selected plurality of first consumer instructions to its associated issue lane, if the plurality of first instructions are present at the respective issue arbitration circuit.

15. The clustered scheduler circuit of claim 1, wherein the plurality of issue arbitration circuits are each configured to pass the selected plurality of second consumer instructions to its associated issue lane, if the plurality of first instructions are present at the respective issue arbitration circuit.

16. The clustered scheduler circuit of claim 1, wherein the plurality of issue arbitration circuits are each configured to selectively pass one of the plurality of first consumer instructions and the plurality of second consumer instructions to its associated issue lane based on a heuristic determination of the plurality of first consumer instructions and plurality of second consumer instructions.

17. A method of scheduling a plurality of instructions comprising producer instructions and consumer instructions to be executed in an execution circuit in a processor, comprising:

receiving first consumer instructions among the plurality of instructions dependent on the producer instructions having a single clock cycle latency;
storing the first consumer instructions in first reservation entries among a plurality of first reservation entries;
receiving a plurality of single clock cycle latency wake-up signals each associated with an issue lane among a plurality of issue lanes, the plurality of single clock cycle latency wake-up signals each indicating an issue state of a single clock cycle latency producer instruction in an issue lane among the plurality of issue lanes;
determining if the plurality of first consumer instructions are ready to be scheduled for execution, in response to the plurality of single clock cycle latency wake-up signals associated with a single clock cycle latency producer instruction of the plurality of first consumer instructions having an issue state of issue ready;
identifying the plurality of first consumer instructions having the issue state of issue ready;
selecting a plurality of first consumer instructions stored among the plurality of first reservation entries identified as having an issue state of issue ready;
receiving second consumer instructions among the plurality of instructions dependent on producer instructions having a same second clock cycle latency of at least two (2) clock cycles having a same second clock cycle latency of at least two (2) clock cycles;
storing the second consumer instructions in second reservation entries among a plurality of second reservation entries;
receiving a plurality of second clock cycle latency wake-up signals each associated with an issue lane among the plurality of issue lanes, the plurality of second clock cycle latency wake-up signals each indicating an issue state of a second clock cycle latency producer instruction in an issue lane among the plurality of issue lanes;
determining if the plurality of second consumer instructions are ready to be scheduled for execution, in response to the plurality of second clock cycle latency wake-up signals associated with a second clock cycle latency producer instruction of the plurality of second consumer instructions having an issue state of issue ready;
identifying the plurality of second consumer instructions having the issue state of issue ready;
selecting a plurality of second consumer instructions stored among the plurality of second reservation entries identified as having an issue state of issue ready;
passing a consumer instruction among the selected plurality of first consumer instructions and the selected plurality of second consumer instructions to its associated issue lane; and
generating a single clock cycle latency wake-up signal among the plurality of single clock cycle latency wake-up signals having an issue state of issue ready, in response to a single clock cycle latency producer instruction issued.

18. The method of claim 17, further comprising:
receiving third consumer instructions among the plurality of instructions dependent on producer instructions having a same third clock cycle latency of at least two (2) clock cycles and a different latency from the second clock cycle latency;
storing the third consumer instructions in third reservation entries among a plurality of third reservation entries;
receiving a plurality of third clock cycle latency wake-up signals each associated with an issue lane among the plurality of issue lanes, the plurality of third clock cycle latency wake-up signals each indicating an issue state of a third clock cycle latency producer instruction in an issue lane among the plurality of issue lanes;

determining if the plurality of third consumer instructions are ready to be scheduled for execution, in response to the plurality of third clock cycle latency wake-up signals associated with a third clock cycle latency producer instruction of the plurality of third instructions having an issue state of issue ready;

identifying the plurality of third consumer instructions having the issue state of issue ready; and selecting a plurality of third consumer instructions stored among the plurality of third reservation entries identified as having an issue state of issue ready; and passing a third consumer instruction among the selected plurality of third consumer instructions to its associated issue lane.

19. The method of claim 17, further comprising delaying the clock cycle latency wake-up signals based on the single clock cycle latency wake-up signal by at least one clock cycle as the second clock cycle latency wake-up signals.

20. The method of claim 17, further comprising delaying the selected plurality of second consumer instructions by at least one clock cycle.

21. The method of claim 20, further comprising delaying the clock cycle latency wake-up signals based on the single clock cycle latency wake-up signal by at least one clock cycle as the second clock cycle latency wake-up signals.

22. A processor, comprising:
an instruction processing circuit comprising one or more instruction pipelines comprising a clustered scheduler circuit and an execution circuit;
the instruction processing circuit configured to fetch a plurality of instructions from a memory into an instruction pipeline among the one or more instruction pipelines;
the clustered scheduler circuit configured to receive the plurality of instructions comprising producer instructions and consumer instructions to be scheduled for execution, the clustered scheduler circuit comprising:
a first latency-based reservation circuit configured to:
receive first consumer instructions among the plurality of instructions dependent on the producer instructions having a single clock cycle latency;
store the first consumer instructions in first reservation entries among a plurality of first reservation entries; and
select a plurality of first consumer instructions stored among the plurality of first reservation entries identified as having an issue state of issue ready;
a first pick circuit coupled to the plurality of first reservation entries and a single clock cycle latency wake-up signal port, the first pick circuit configured to:
receive a plurality of single clock cycle latency wake-up signals on the single clock cycle latency wake-up signal port each associated with an issue lane among a plurality of issue lanes, the plurality of single clock cycle latency wake-up signals each indicating an issue state of a single clock cycle latency producer instruction in an issue lane among the plurality of issue lanes;
determine if the plurality of first consumer instructions are ready to be scheduled for execution, in response to the plurality of single clock cycle latency wake-up signals associated with the single clock cycle latency producer instruction of the plurality of first consumer instructions having an issue state of issue ready; and
identify the plurality of first consumer instructions having the issue state of issue ready;
a second latency-based reservation circuit configured to:
receive second consumer instructions among the plurality of instructions dependent on the producer instructions having a same second clock cycle latency of at least two (2) clock cycles;
store the second consumer instructions in second reservation entries among a plurality of second reservation entries; and
select a plurality of second consumer instructions stored among the plurality of second reservation entries identified as having an issue state of issue ready;
a second pick circuit coupled to the plurality of second reservation entries and a second clock cycle latency wake-up signal port, the second pick circuit configured to:
receive a plurality of second clock cycle latency wake-up signals on the second clock cycle latency wake-up signal port each associated with an issue lane among the plurality of issue lanes, the plurality of second clock cycle latency wake-up signals each indicating an issue state of a second clock cycle latency producer instruction in an issue lane among the plurality of issue lanes;
determine if the plurality of second consumer instructions are ready to be scheduled for execution, in response to the plurality of second clock cycle latency wake-up signals associated with a second clock cycle latency producer instruction of the plurality of second consumer instructions having an issue state of issue ready; and
identify the plurality of second consumer instructions having the issue state of issue ready;
a plurality of issue arbitration circuits each coupled to an associated issue lane among the plurality of issue lanes and coupled to the first latency-based reservation circuit and the second latency-based reservation circuit, the plurality of issue arbitration circuits each configured to pass an instruction among the selected plurality of first consumer instructions and the selected plurality of second consumer instructions to its associated issue lane; and
a plurality of issue lane circuits comprising the plurality of issue lanes, each issue lane circuit among the plurality of issue lane circuits configured to generate a single clock cycle latency wake-up signal among the plurality of single clock cycle latency wake-up signals having an issue state of issue ready on the single clock cycle latency wake-up signal port, in response to a single clock cycle latency producer instruction issued in the issue lane circuit.

* * * * *